Oct. 2, 1951 W. M. BACON 2,569,443

TELEGRAPH STORAGE SYSTEM

Filed June 6, 1946 19 Sheets-Sheet 1

INVENTOR
W. M. BACON
BY J. W. Schmied
ATTORNEY

Oct. 2, 1951 W. M. BACON 2,569,443

TELEGRAPH STORAGE SYSTEM

Filed June 6, 1946 19 Sheets-Sheet 2

INVENTOR
W.M. BACON
BY J W Schmied
ATTORNEY

Oct. 2, 1951 W. M. BACON 2,569,443

TELEGRAPH STORAGE SYSTEM

Filed June 6, 1946 19 Sheets-Sheet 3

INVENTOR
W. M. BACON
BY J W Schmied
ATTORNEY

Oct. 2, 1951 W. M. BACON 2,569,443

TELEGRAPH STORAGE SYSTEM

Filed June 6, 1946 19 Sheets-Sheet 4

INVENTOR
W. M. BACON
BY J. W. Schmied
ATTORNEY

TELEGRAPH STORAGE SYSTEM

INVENTOR
W. M. BACON
BY J W Schmied
ATTORNEY

Oct. 2, 1951 W. M. BACON 2,569,443

TELEGRAPH STORAGE SYSTEM

Filed June 6, 1946 19 Sheets-Sheet 6

INVENTOR
W. M. BACON
BY J W Schmied
ATTORNEY

INVENTOR
W. M. BACON
BY J. W. Schmied
ATTORNEY

INVENTOR
W. M. BACON
BY J W Schmied
ATTORNEY

TELEGRAPH STORAGE SYSTEM

Filed June 6, 1946 19 Sheets-Sheet 9

INVENTOR
W. M. BACON
BY J W Schmied
ATTORNEY

INVENTOR
W. M. BACON
BY J W Schmied
ATTORNEY

Oct. 2, 1951 W. M. BACON 2,569,443

TELEGRAPH STORAGE SYSTEM

Filed June 6, 1946 19 Sheets-Sheet 11

INVENTOR
W. M. BACON
BY J. W. Schmied
ATTORNEY

Oct. 2, 1951 W. M. BACON 2,569,443

TELEGRAPH STORAGE SYSTEM

Filed June 6, 1946 19 Sheets-Sheet 12

INVENTOR
W. M. BACON
BY J W Schmied
ATTORNEY

Oct. 2, 1951 W. M. BACON 2,569,443

TELEGRAPH STORAGE SYSTEM

Filed June 6, 1946 19 Sheets-Sheet 13

INVENTOR
W. M. BACON
BY J W Schmied
ATTORNEY

INVENTOR
W. M. BACON
BY J W Schmied
ATTORNEY

INVENTOR
W. M. BACON
BY J W Schmied
ATTORNEY

INVENTOR
W. M. BACON
BY J. W. Schmied
ATTORNEY

TELEGRAPH STORAGE SYSTEM

INVENTOR
W. M. BACON
BY J. W. Schmied
ATTORNEY

Oct. 2, 1951 W. M. BACON 2,569,443

TELEGRAPH STORAGE SYSTEM

Filed June 6, 1946 19 Sheets-Sheet 18

INVENTOR
W. M. BACON
BY J. W. Schmied
ATTORNEY

TELEGRAPH STORAGE SYSTEM

Filed June 6, 1946 19 Sheets-Sheet 19

INVENTOR
W. M. BACON
BY J W Schmied
ATTORNEY

Patented Oct. 2, 1951 2,569,443

UNITED STATES PATENT OFFICE 2,569,443

TELEGRAPH STORAGE SYSTEM

Walter M. Bacon, New York, N. Y., assignor to Bell Telephone Laboratories, Incorporated, New York, N. Y., a corporation of New York Application June 6, 1946, Serial No. 674,723

16 Claims. (Cl. 178—3)

This invention relates to telegraph switching systems in which messages are stored in switching offices, and more particularly, to improvements in such systems for the purpose of preventing or reducing temporary overloading of outgoing lines or channels of transmission with certain classes of messages with resultant exclusion from those lines of other messages or classes of messages.

Arrangements according to the invention or involving the principles thereof may be embodied in different forms of system. In order to elucidate the principles of the invention and make manifest arrangements comprising exemplary embodiments thereof, it will first be necessary to summarize the principal features of a type of existing system in which exemplary types of the invention may be incorporated.

In an existing type of system a message storing and automatically operating message directing switching office is provided which may be connected by trunk lines to other identical or similar offices. To the central switching office there are connected a number of lines or channels of transmission which are usually duplexed, that is, they may transmit in both directions simultaneously and may utilize the same wires for incoming and outgoing transmission or transmission over intermediate sections between offices in accordance with well-known telegraph duplex practice, or they may use separate and oppositely directed paths of transmission, two of which, incoming and outgoing, are associated together as a duplex two-way line. The invention does not exclude half-duplex lines or channels which are or may be used as a part of the lines or channels of such a system or as the entirety thereof. At one or more outlying stations of such a channel of transmission, which will often hereinafter for convenience be referred to as a line, there are provided telegraph transmitters usually of the automatic type, or which may be manually operated, with associated teletypewriter or code receivers. The transmitters and receivers may be used together as a station or some stations may have transmitters only and others receivers only or some stations may have two different receivers, one of which may be provided with multiple code forms and the other provided with means for producing a single copy only of the received message. Means are provided at the central switching office whereby the outlying transmitters are assigned times or opportunities to transmit to the central office whereat the incoming transmitted messages are recorded in a reperforator.

There may also be single station lines connected to transmit into a similar reperforator in the central office and there may also be originating stations in the central office consisting of a keyboard perforator into which message material may be recorded for transmission to one or more of the various outlying offices of the system. Incoming messages recorded by the central office reperforators or recorded by the keyboard perforators of the originating stations at the central office are self-directing. Usually each message begins with one or more letters shift code combinations, then an upper case in figures shift combination, followed by a combination which, in general, may be used as an end-of-message message signal to clear out any false or erroneous connections accidently established through the system (if these be such), then one or more letters characters, then two code combinations comprising the address, followed by the message proper, followed by an upper case code combination used as an end-of-message message signal. The two code combinations which comprise the address function coadjuvantly to select a path of transmission across the switching office from an automatic transmitter controlled by the stored message along with its address to a reperforator associated with an outgoing line or channel of transmission which, in general, may be any one of the duplex lines or half-duplex lines referred to previously. Each outgoing line in the exemplary type of system is provided with two reperforator-transmitter sets (there may be more) which are so arranged as to transmit their messages alternately one after the other, first a message from one transmitter then a message from the other transmitter so long as both are provided with messages to be transmitted. When only one is provided with such messages it proceeds to transmit messages one after the other until its message material is exhausted or the other transmitter is provided with message material comprising one or more messages. Reperforators receive messages from the incoming line transmitters over one or another of two types of paths. Paths of both of these types are selected by each two code combinations constituting an address but the reperforators are connected to one or the other only and the other remains idle. If the path connected is such as to lead to a reperforator associated with line connected to one or more outlying stations, the first code combination, after it is used to select the path, is not transmitted over the used path but is absorbed or dropped. The second code combination is transmitted over the path and appears in the outgoing line reperforator and is transmitted over the outgoing line by the outgoing line transmitter to control a switching selector remotely located on the line and it causes the selective conditioning of the receiver constituting the proper address to receive the message. If the two code combinations which select a path across the office are such as to select a reperforator associated with a trunk circuit leading to another switching office, the transmission across the office occurs over another type of path over which both the code combinations of address are transmitted to be recorded by the reperforator associated with the trunk line. In this prior type of system there are also arrangements sometimes referred to as intercept circuits. One kind of intercept circuit is known as a wilful intercept circuit. In accordance with the operation of this arrangement, upon the operation of a certain key or keys, messages intended for certain stations or certain outgoing lines, instead of being directed to an outgoing line reperforator, are directed to a wilful intercept reperforator and stored for subsequent retransmission if and when the keys are restored and other appropriate keys properly positioned. The transmitter associated with the wilful intercept reperforator is coordinate in function to the transmitter associated with the perforator of a message originating station or position in the central switching office. Messages transmitted to the wilful intercept reperforator proceed thereto over a path which sends to the reperforator both the directing code combinations. A system of the type thus described is known and is described in a patent issued upon copending application of the joint inventors D. E. Branson-F. S. Kinkead-J. A. Krecek-G. A. Locke, No. 2,430,447, dated November 11, 1947.

In the operation of a system such as just described, the system or certain lines of the system may be fully occupied during certain hours of the day with regular business messages whose expeditious transmission is desired. There may be certain other times when the system is lightly loaded with such messages and it is desired to make use of it for relatively long messages for which expeditious transmission is not particularly necessary. With respect to such long messages originating at the switching office attendants may introduce them into the system during period of light loads but this requires special attention on the part of operating personnel. Moreover, let it be supposed that the control board shows a particular outgoing line to be lightly loaded and the operating personnel at such times initiates the transmission of two or more long messages directed to a particular outgoing line. These long messages each may seize a path directed to outgoing line reperforators and if there are two such reperforators, both might become occupied by two long messages. To make the situation concrete, if each of these messages require six minutes transmission time (herein assumed maximum transmission time of a long message) and one seizes each of the two reperforators associated with an outgoing line, the line will be occupied for twelve minutes because each of the two transmitters associated therewith as stated above operate alternately to send one message each when both are supplied with messages. Let it be supposed that at the instant of initiating transmission of such long messages from an originating station at the switching office a particular outgoing line is idle but immediately thereafter several short messages arrive from outlying stations directed to the same outgoing line, then it would be almost twelve minutes before the outgoing line is free and available for the transmission of these short messages, several of which may become accumulated in the meantime. Furthermore, in the case of long messages originating at outlying stations the attendants thereat ordinarily lack present knowledge of conditions at the central switching office and may initiate the transmission of long messages at a time when the particular outgoing line to which they are directed is or is about to be fully occupied. Such long messages arrive at the central office and immediately in their proper turn preempt the outgoing line reperforators to which they are directed for periods of time up to six minutes or multiples thereof which may result in an undesired delay of short regular business messages. It therefore becomes desirable to prevent the clogging of the storage tape of outgoing line reperforators of the system with too many long messages and an object of this invention is to provide methods of operation and equipment whereby this prevention is automatically accomplished. In the exemplary embodiment each outgoing line is provided with two transmitters as stated above and these transmitters when fully loaded operate in alternation to send messages stored by their associated reperforators to the outgoing line.

The object of the invention is accomplished by intercepting long messages which originate at outlying stations in a special intercept circuit or circuits and so condition their delivery from such intercept circuits as well as the delivery of long messages originated at the central switching office to outgoing line reperforators that one outgoing line reperforator and its associated transmitter will always be free of long messages and, moreover, upon delivery of one long message to any given outgoing line reperforator it is so conditioned as not to be available to receive another until the one message has been completely transmitted. As a further prerequisite for delivering a long message to an outgoing line reperforator the condition may be imposed that both the outgoing line reperforator-transmitter sets are void of message material to be transmitted. This may result in short periods of time when the outgoing line is idle even though long messages are available for transmission thereover.

The arrangement just described is one species of the invention and comprises one of the exemplary embodiments herein disclosed; a preferred arrangement is disclosed in which delivery of long messages to outgoing line reperforator-transmitter sets is restricted to only one of the two reperforator-transmitters associated with a given line and further restricted in that after delivery of one long message to this reperforator-transmitter set no further long message may be delivered thereto until a previous long message is completely transmitted and further restricted in that the other associated reperforator-transmitter set of the line has at some time or other been void of message material after the preceding long message has been delivered to the one available reperforator-transmitter set which is open to receive such messages, and further restricted in that the reperforator-transmitter set which is assigned to receive and transmit long messages must be void of message material before it is permitted to receive any long message. In accordance with this arrangement an outgoing line can not usually be utilized for more than six minutes while ordinary messages are awaiting transmission in the switching office over that line although a long message may proceed to its destination before one or more short messages. Thus, for example, let us designate one reperforator-transmitter set on a line as No. 1 and the other which is assigned to receive long messages as No. 2. It may happen that after being idle for some time the reperforator-transmitter of set No. 1 will receive several messages in succession for transmission and at the same time the reperforator-transmitter set No. 2 which has become idle will receive and accept a long message. As soon as the first message has been cleared out of reperforator-transmitter set No. 1 the reperforator-transmitter set No. 2 will seize and preempt the line for transmission of its long message whereas subsequent messages stored in reperforator-transmitter set No. 2 will await the completion of transmission of the long message of reperforator-transmitter set No. 2. However, under these circumstances the use of the line for a long message will not consume more than six minutes whereupon no further long messages can be accepted by the reperforator-transmitter set No. 2 until reperforator-transmitter set No. 1 has at some time become void of message material and, furthermore, until reperforator-transmitter set No. 2 is void of message material. Thus the maximum time of usage of the outgoing line by a long message when short messages are awaiting transmission is limited to the time of transmission of one long message. Of course, the assumed six-minute duration for a long message is purely arbitrary time selected for purposes of explanation. In practice, the long messages may be of any length. In other words the term "long" is used broadly as a designation for a special class of messages. Message classes may consist of messages assorted according to length, urgency, address or addresses, page or tape receiving machines at their addresses, or business nature; however, to be handled by the exemplary system as "long" messages they must have a special code address.

The means whereby long messages are prevented from clogging up the outgoing line reperforator-transmitter sets will now be outlined. All such long messages which originate at outlying stations are preceded by a special character which causes them to be directed to the long message intercept reperforator in the switching office. Thus, let us suppose, that the address of a station comprises the character BK. In the case of a long message an extra character is prefixed to the address, for example, the character L, (any other available character may be used) so that the address transmitted from the outlying office then comprises LBK. Upon arriving at the central switching office the combination LB is employed as a selecting combination along with other combinations prefixed by L to direct such a message to one or another of several of the long message intercept reperforators. The cross office path leading to this reperforator is of that type mentioned above in which the first code combination is discarded so that the message upon arriving at the long message reperforator then possesses only the address BK. In the use of the system long messages may be directed to any or all stations but in current practice are directed to only certain stations of the system and all such messages are assigned special groups of code combinations such as LBK when they originate at outlying stations or BK when they originate at the central switching office. The equipment is so arranged that the special code combination such as BK being present as the address of the message in an originating station at the central office or in a long message intercept reperforator at the central office controls the associated director in the central office in such a manner as to pick a path which leads only to one reperforator-transmitter set of an outgoing line. This path is selected only under the conditions outlined above. If a particular outlying station is to receive ordinary messages as well as long messages it may be provided with two receivers, one of which has a special address such as BK assigned for long messages and the other of which receives other messages under control of a different address.

However, an outlying station receiver may be wired to respond to and record messages represented by more than one address of which BK, for example, might be a long message address and BL an ordinary message address. Under such conditions an outlying station would originate ordinary messages with the address BL and long messages with the address LBL. These latter messages would always be intercepted in the long message intercept circuit at the switching office.

From the foregoing it is evident that a feature of the invention comprises methods and apparatus whereby the delivery of message material to a reperforator or similar storage device is conditioned on the conjoint present or past condition of that storage device and one or more other storage devices with respect to the availability thereof for storage or with respect to the quantity of message material stored therein.

Exemplary forms of the invention will now be further described in connection with the accompanying drawings wherein:

Fig. 1A illustrates the relationship in which Figs. 2, 3, and 4 are connected;

Figs. 2, 3 and 4 comprise a schematic showing of a system incorporating the invention;

The general features of an entire system of the type in which the exemplary embodiment of the invention is incorporated are known and are described in the patent of Branson-Kinkead-Krecek-Locke, supra, and one entire line circuit is disclosed in an application of Bacon and Young, Patent No. 2,412,955, dated December 24, 1946. Hence, the following description will be limited as far as possible to the improvements constituting the present invention: the disclosures of the patents mentioned are incorporated herein by reference to the same extent as though set forth here in full and such disclosures are available for a description of any features of operation and detail not herein set forth. Apparatus operating according to the principles of the present invention may, however, be employed in other types of systems than the preferred embodiment which is illustrative rather than limiting.

In order to aid in the understanding of the relationship of arrangements according to the present invention to the disclosure of the Branson-Kinkead-Krecek-Locke patent in which exemplary forms of the invention as described is incorporated, the relationship of certain portions of the present disclosure to the disclosure of the drawings of the said Branson-Kinkead-Krecek-Locke patent will be set forth.

Figures 1A, 1B, 1C, 2:
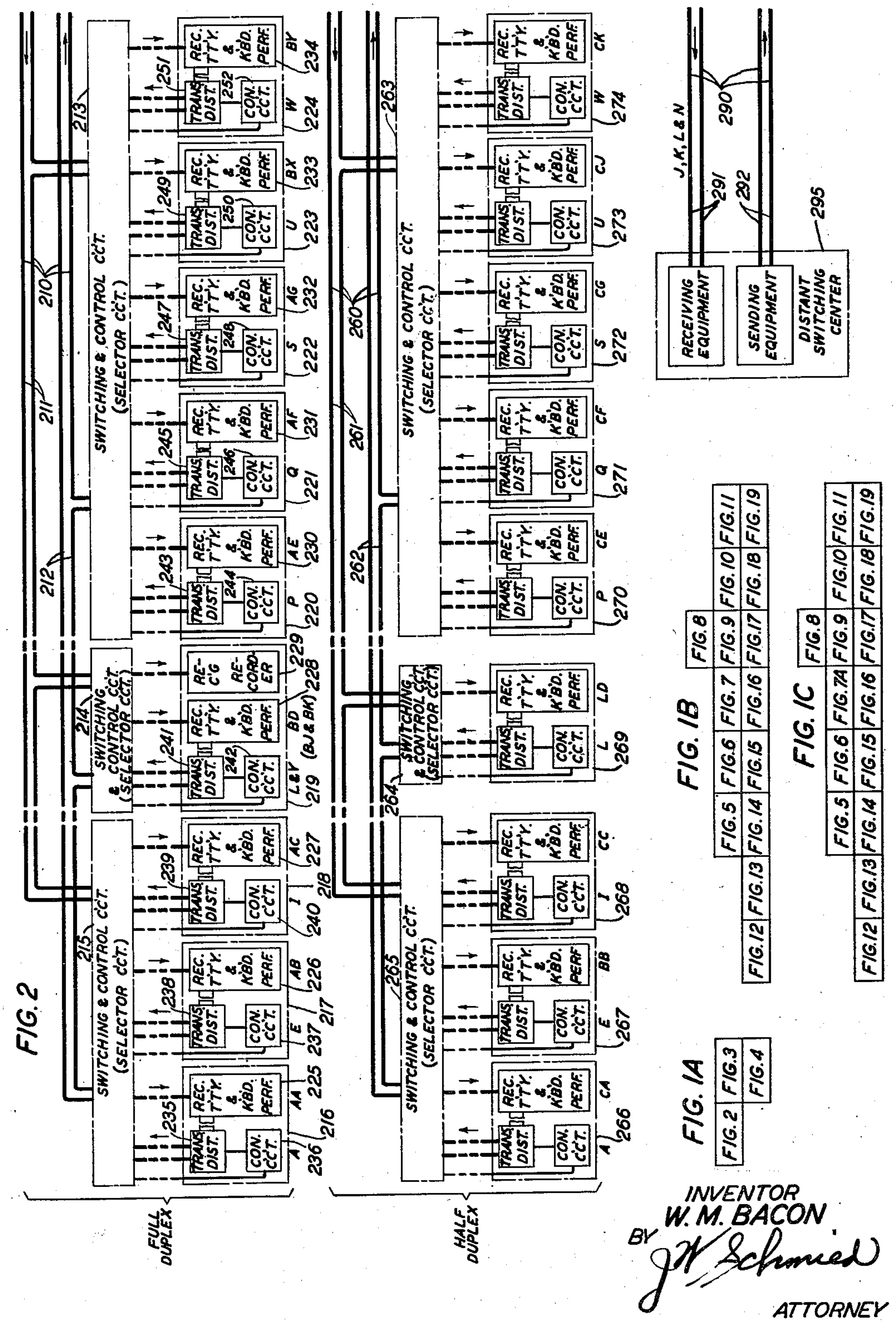
Fig. 1B shows the manner in which Figs. 5 to 19 of the drawings are connected together to illustrate one embodiment of the invention.
Fig. 1C illustrates the manner in which Fig. 7A may be substituted for Fig. 7 and which together with Figs. 5, 6 and 8 to 19, inclusive, illustrates another and preferred embodiment of the invention.
Figure 3:
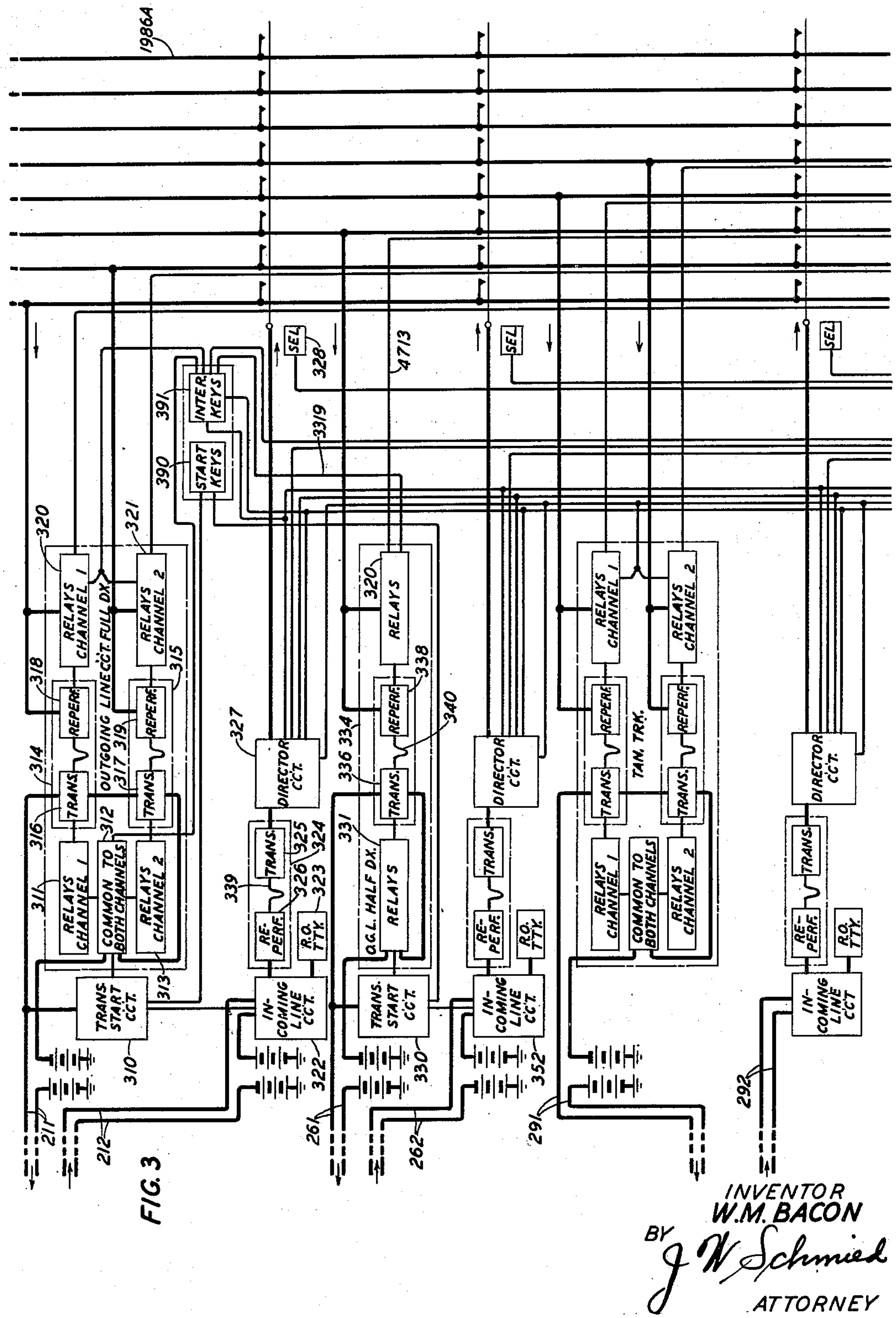
Figure 4:
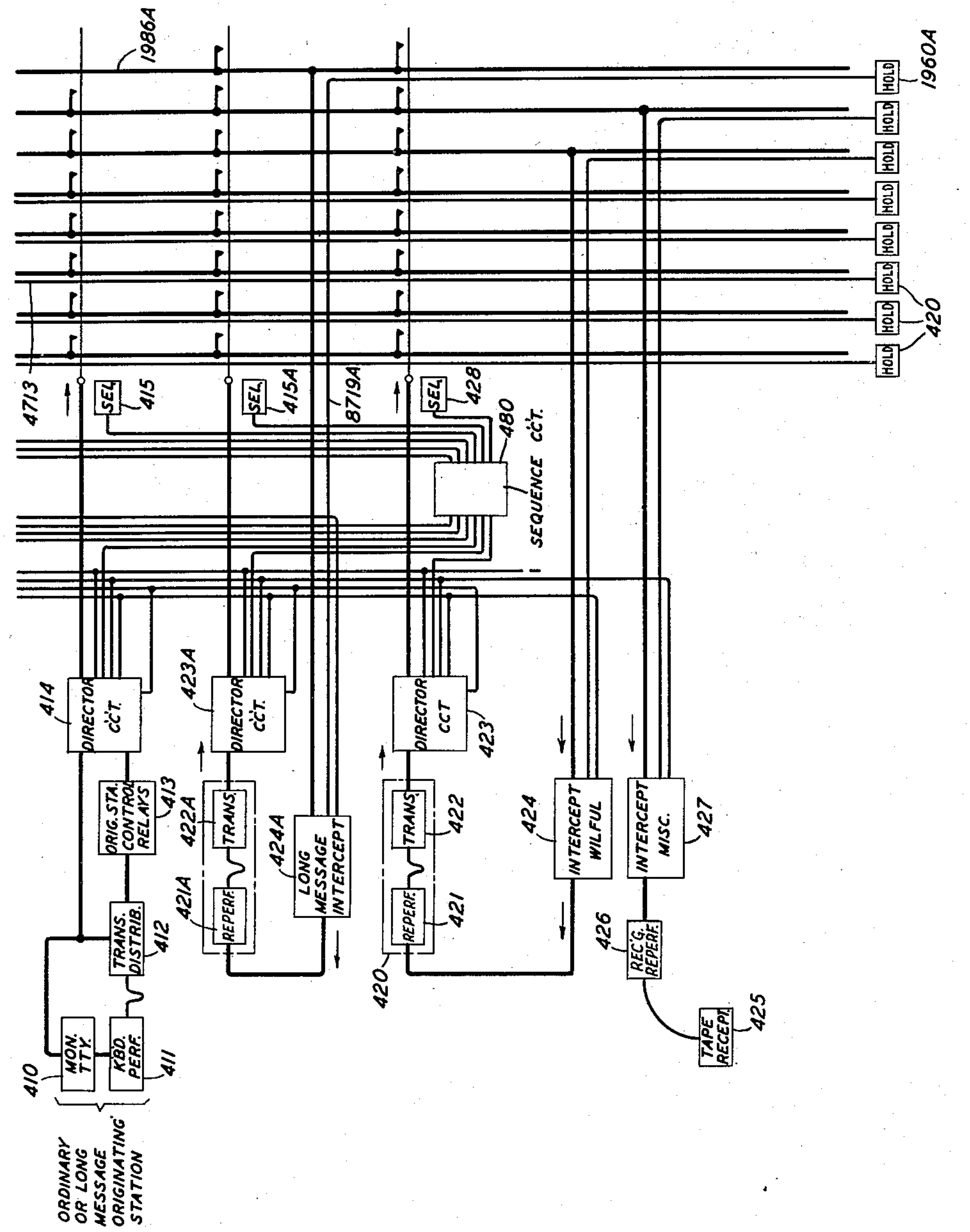
Figure 5:
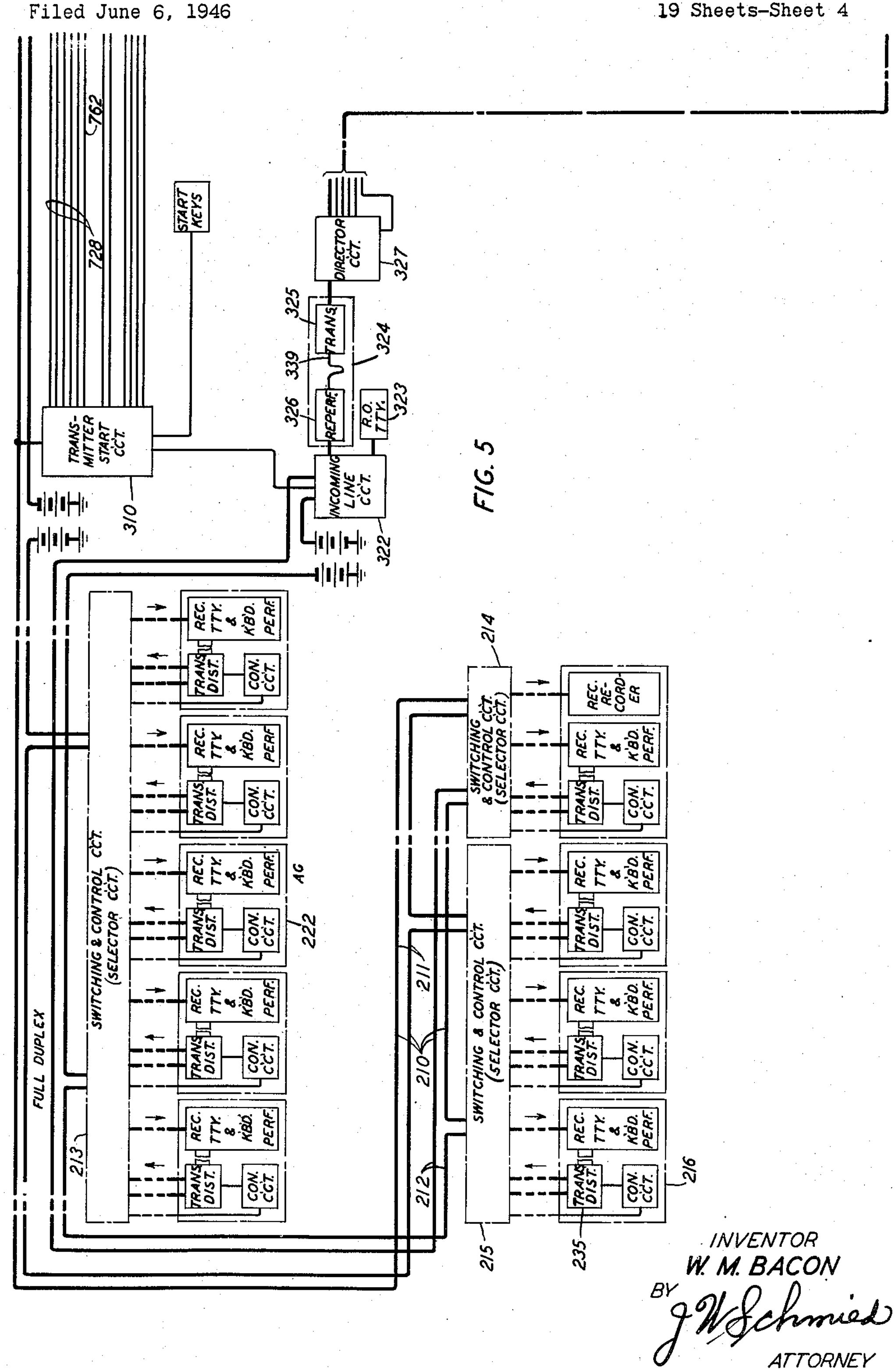
Figs. 5, 6, 7, 7A, 8, 9, 10, 11, 12, 13, 14, 15, 16, 17, 18 and 19 illustrate the circuit arrangements in detail.
Figure 6:
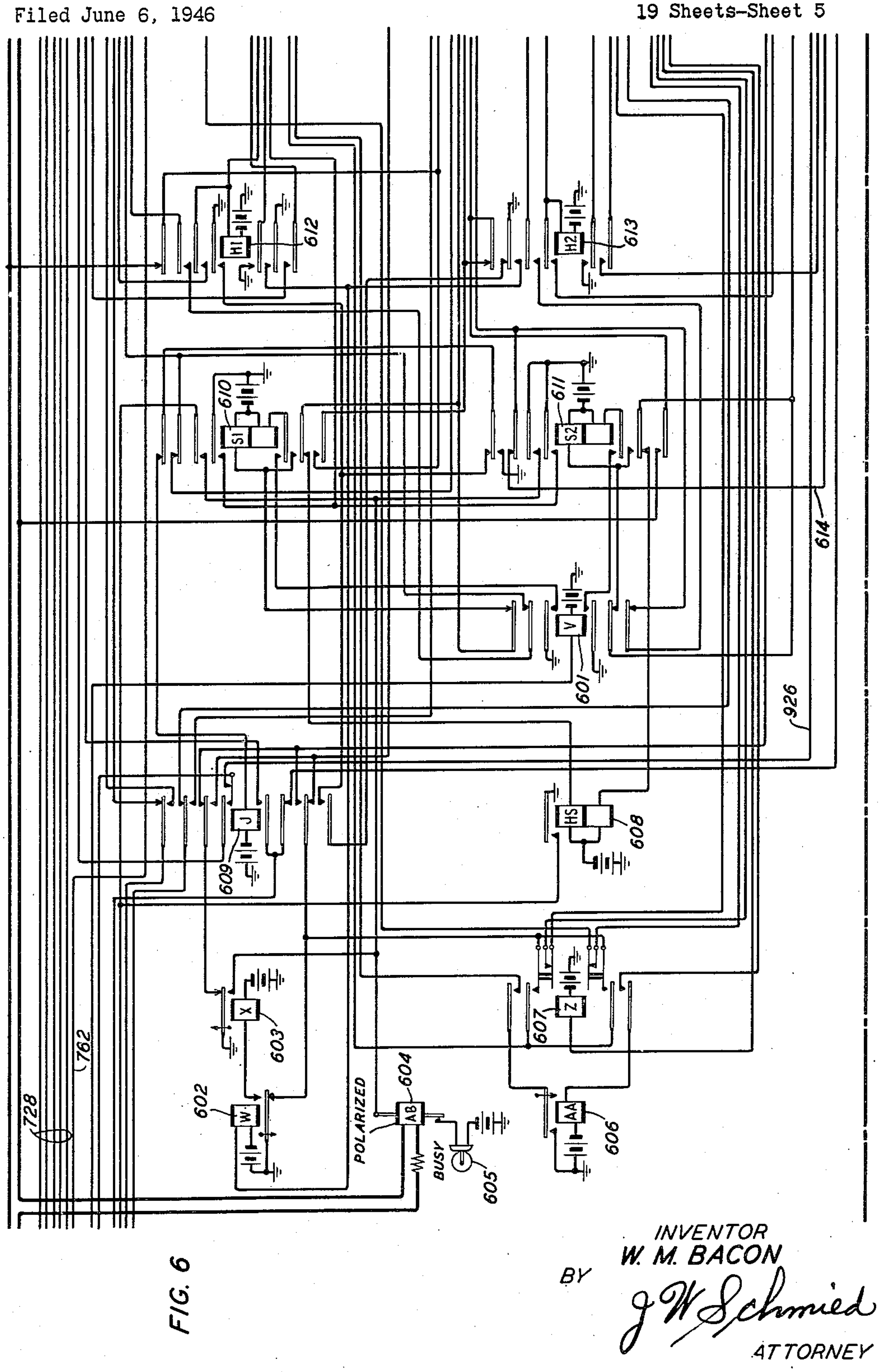
Figure 7:
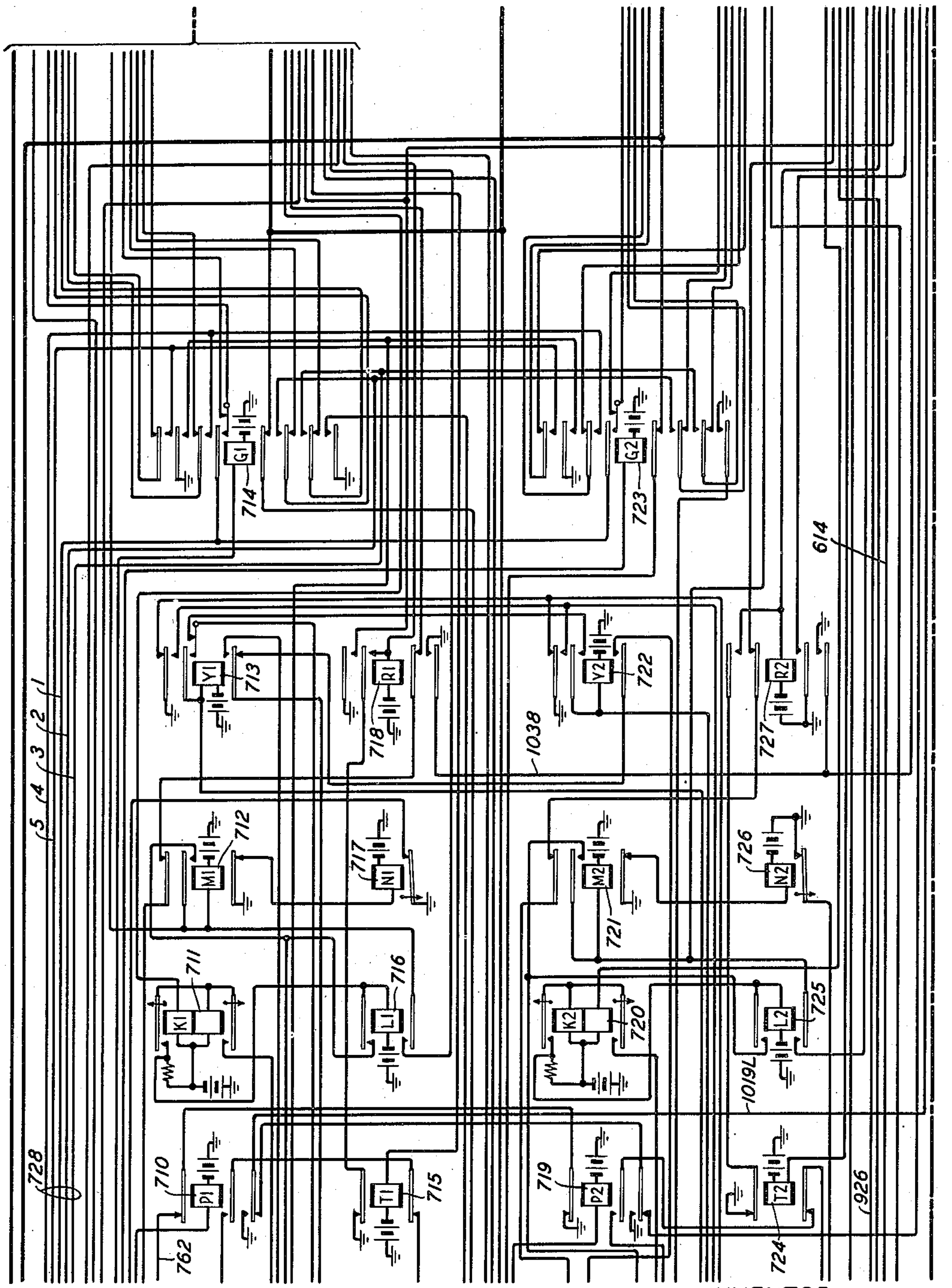
Figure 7A:
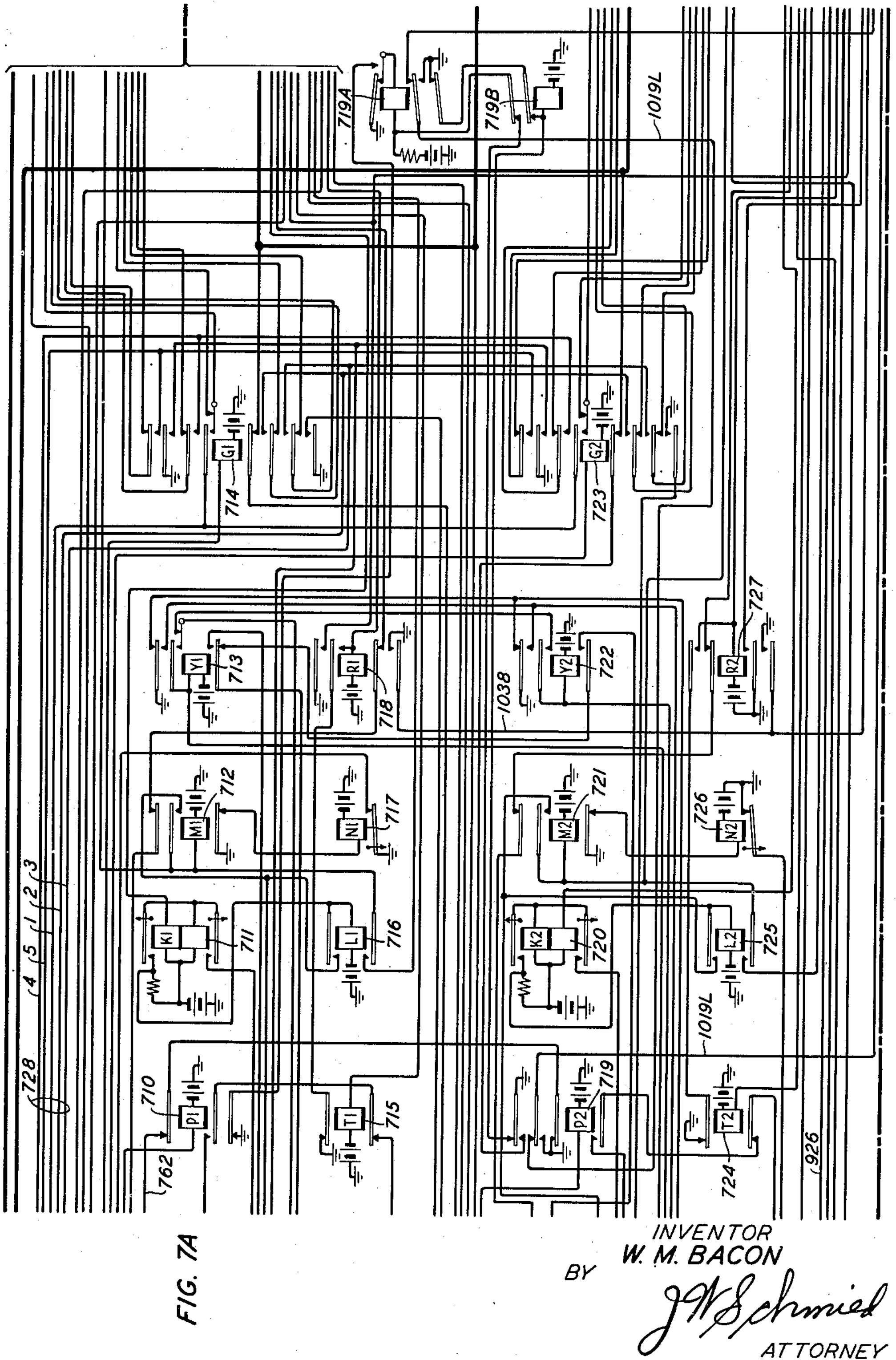
Figure 8:
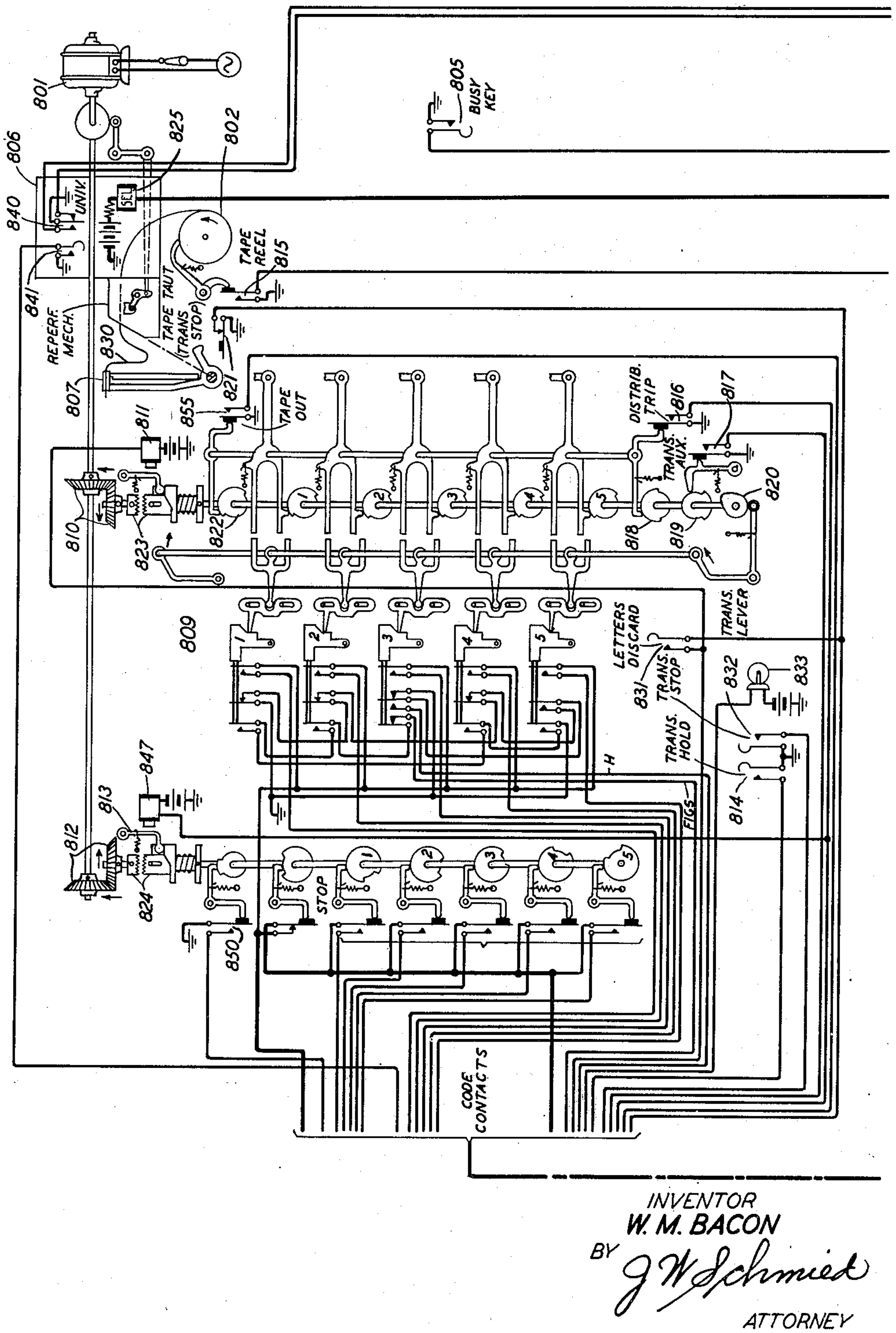
Figure 9:
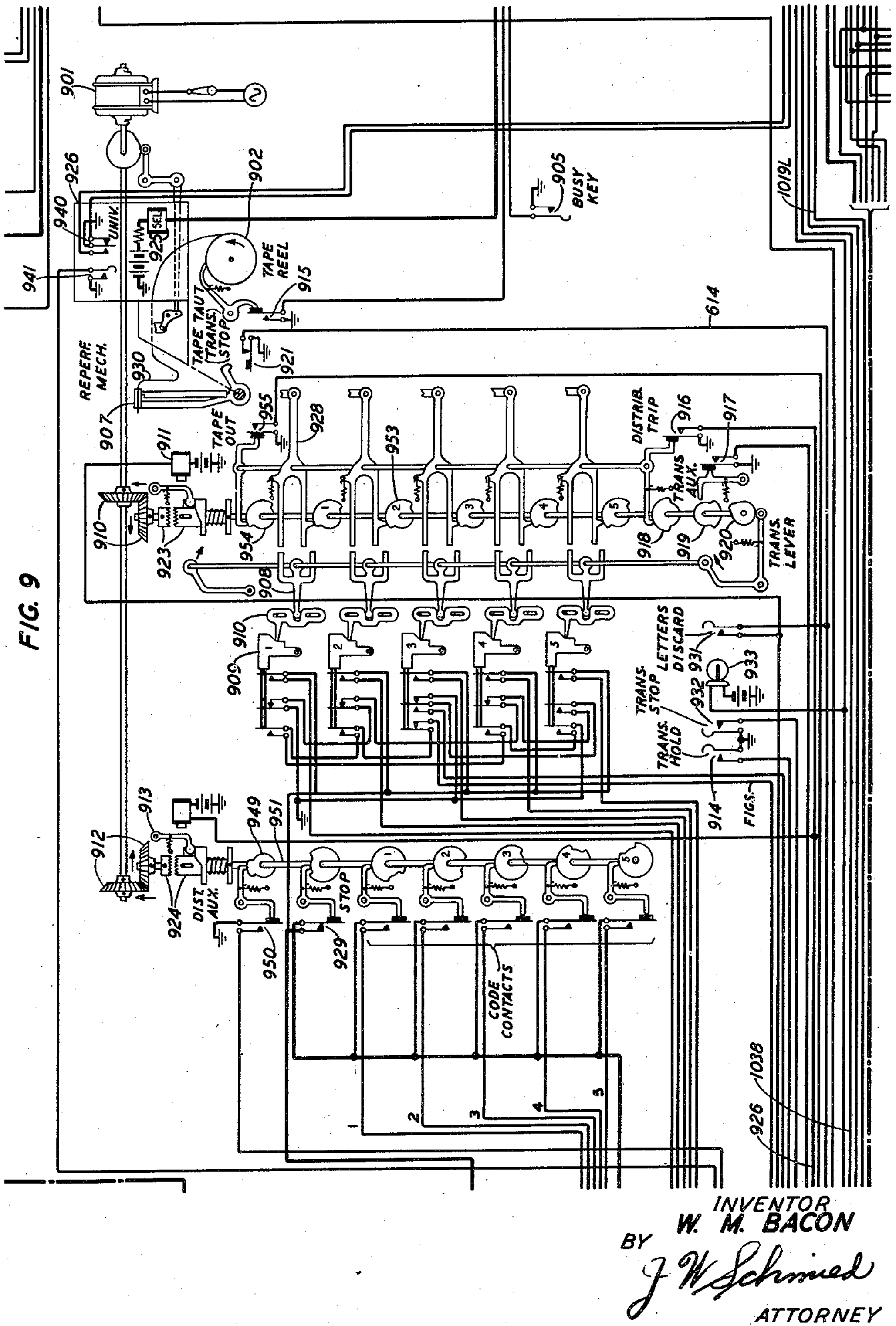
Figure 10:
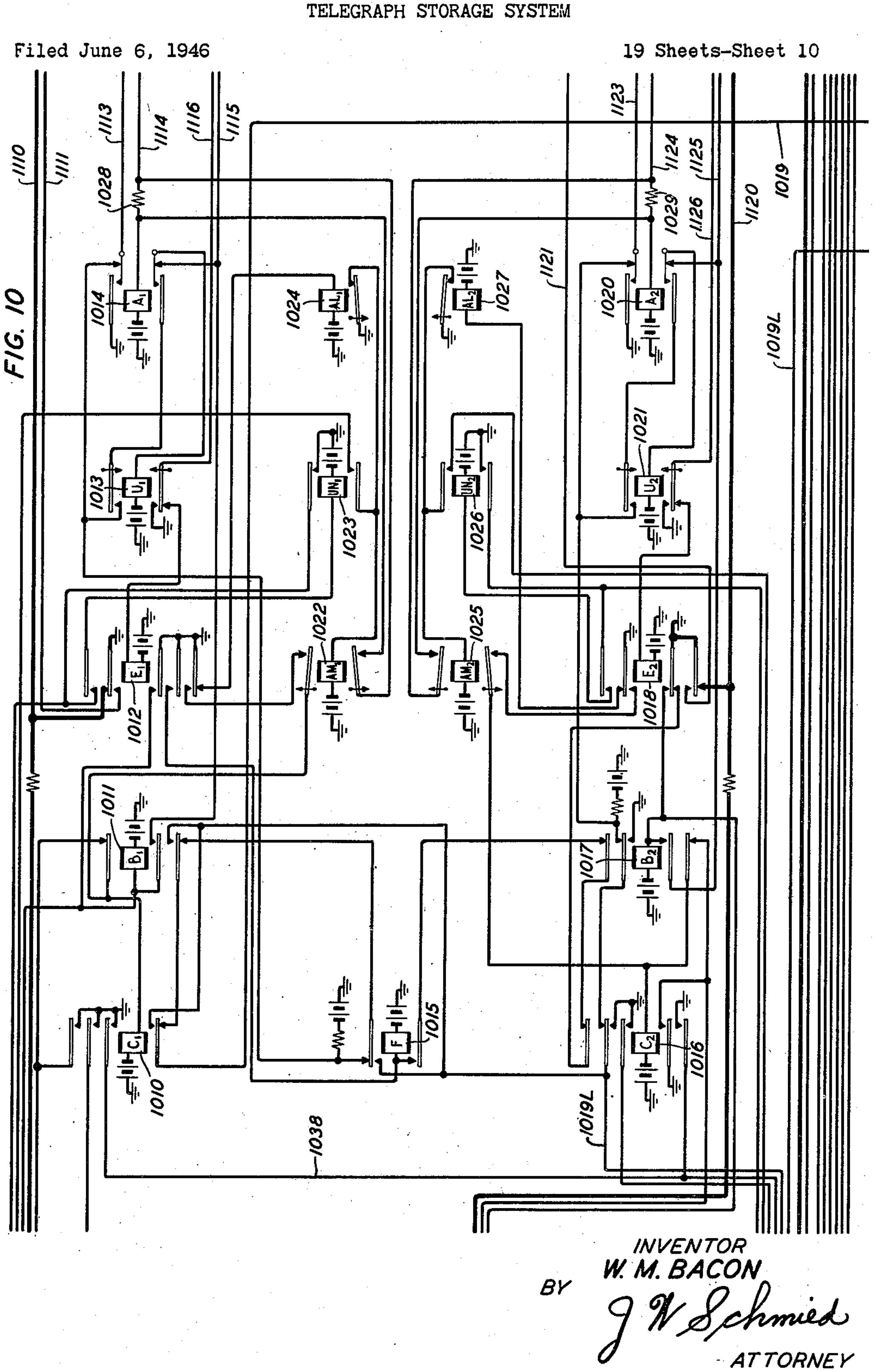
Figure 11:
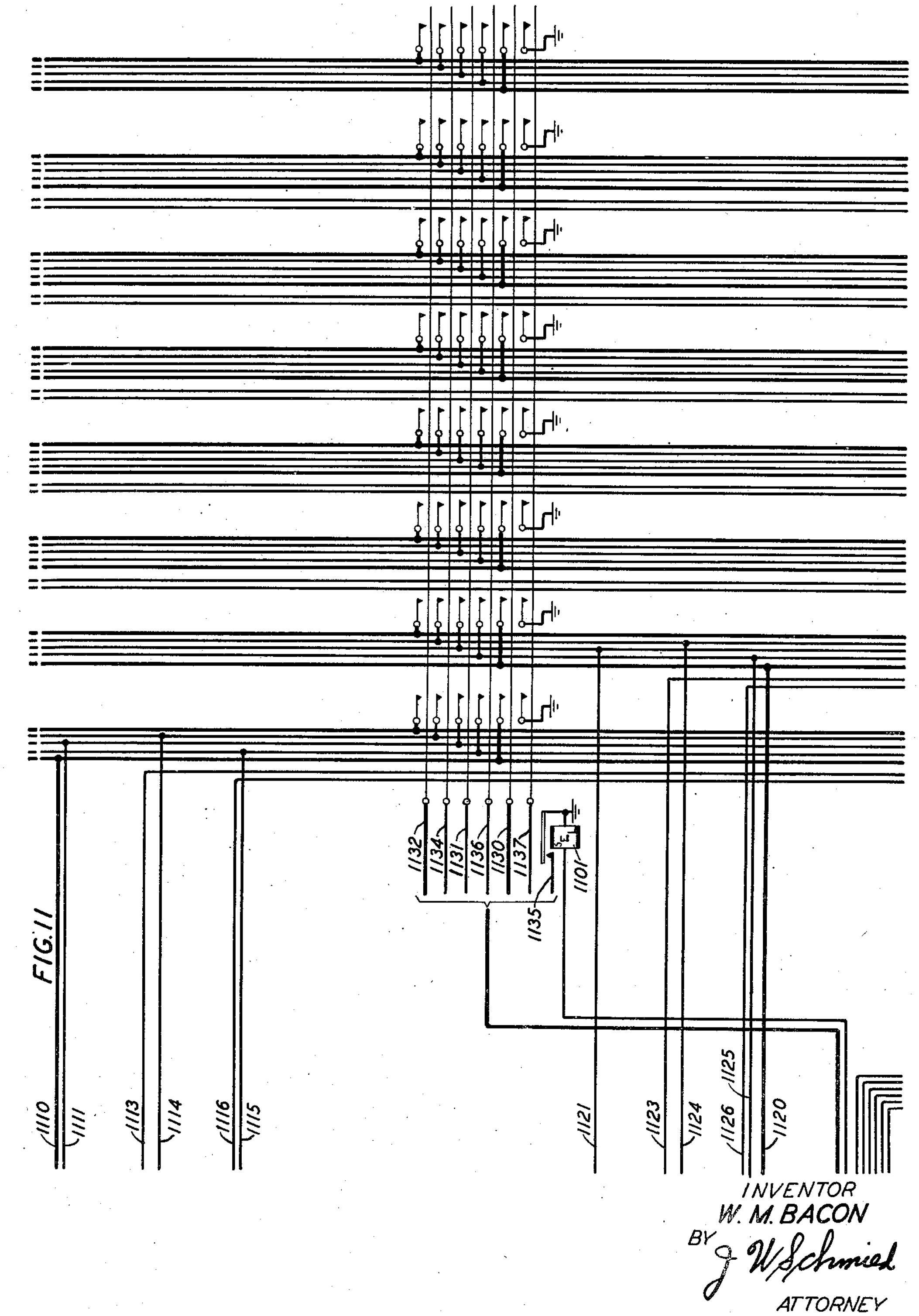
Figure 12:
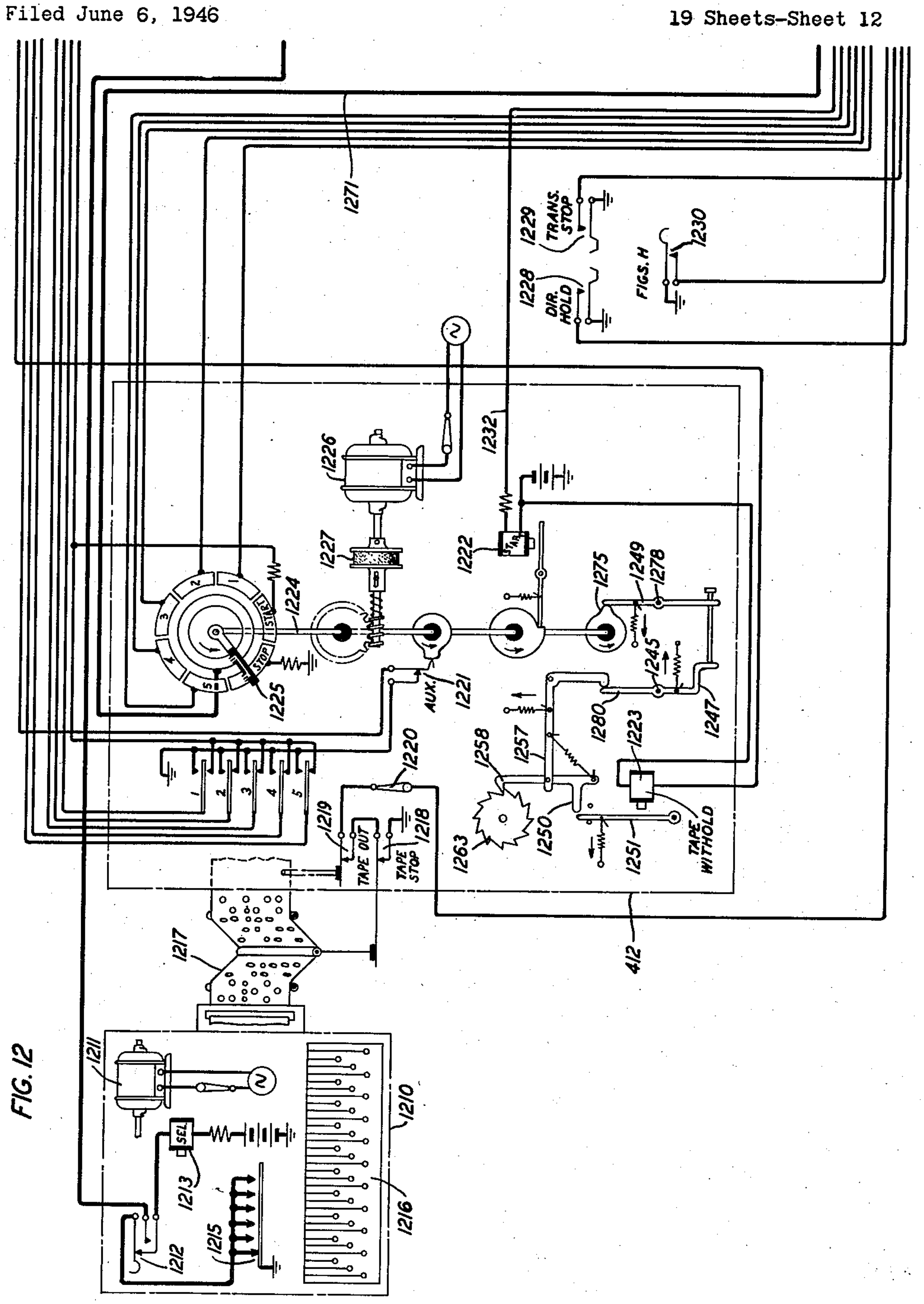
Figure 13:
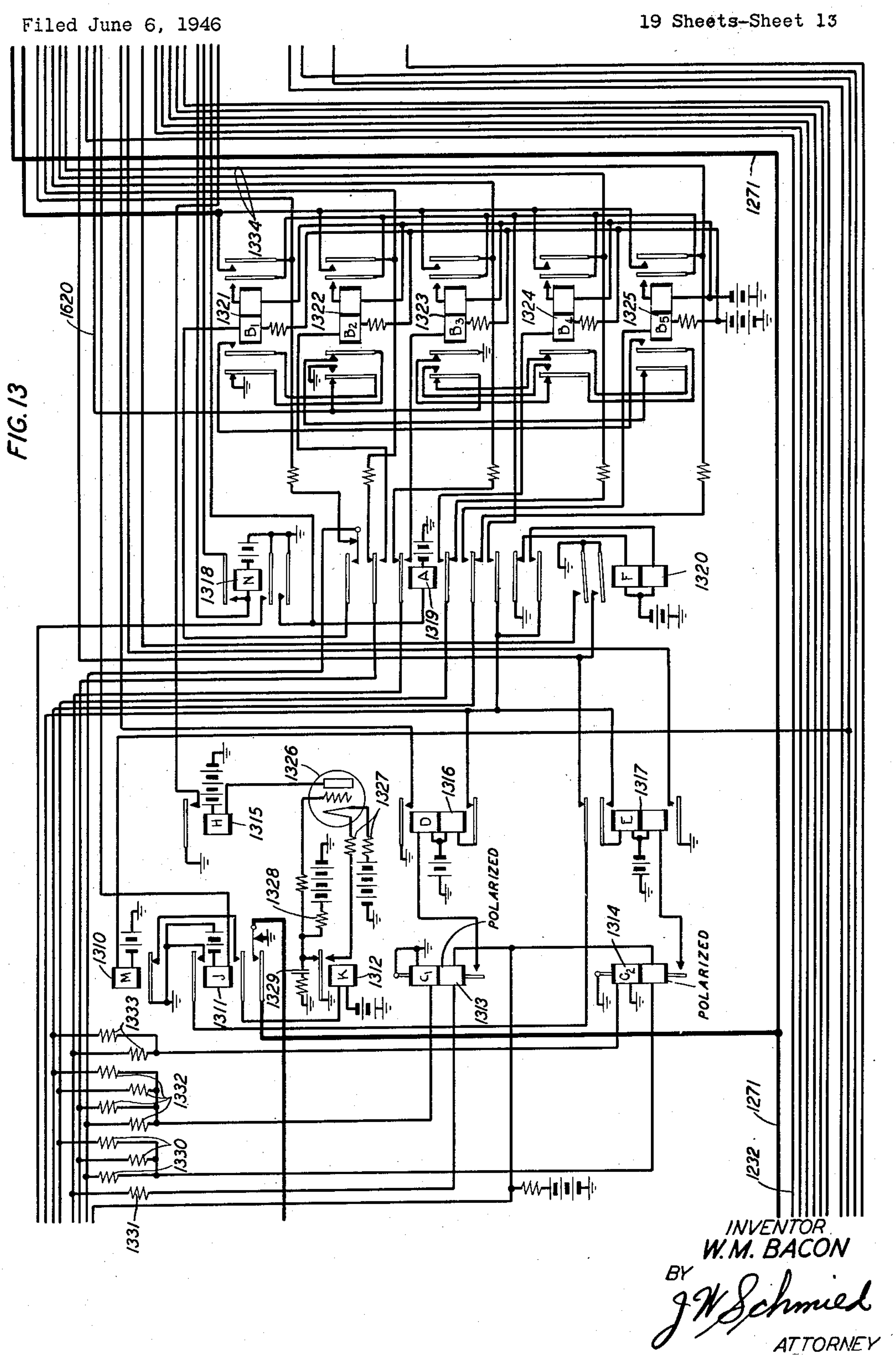
Figure 14:
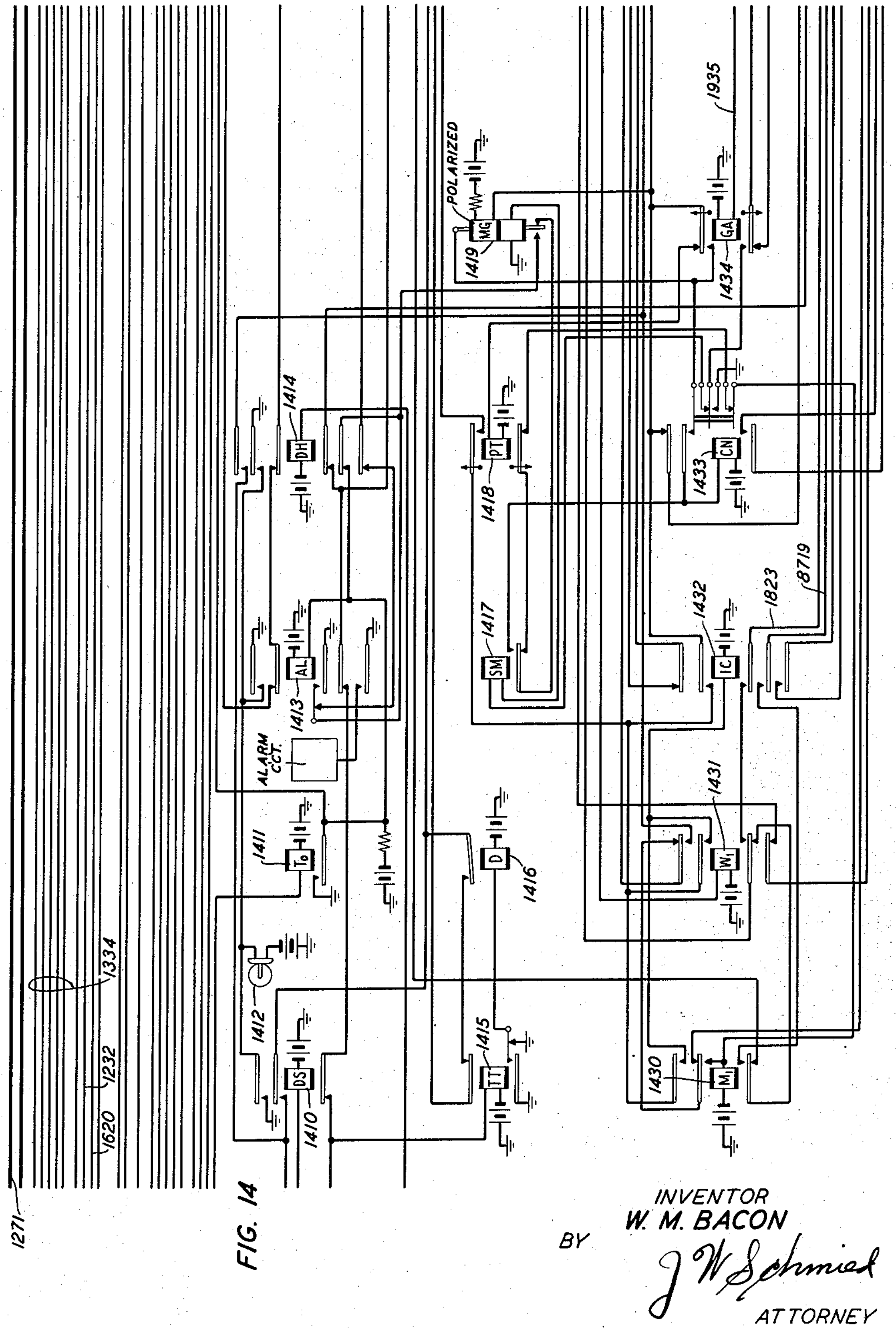
Figure 15:
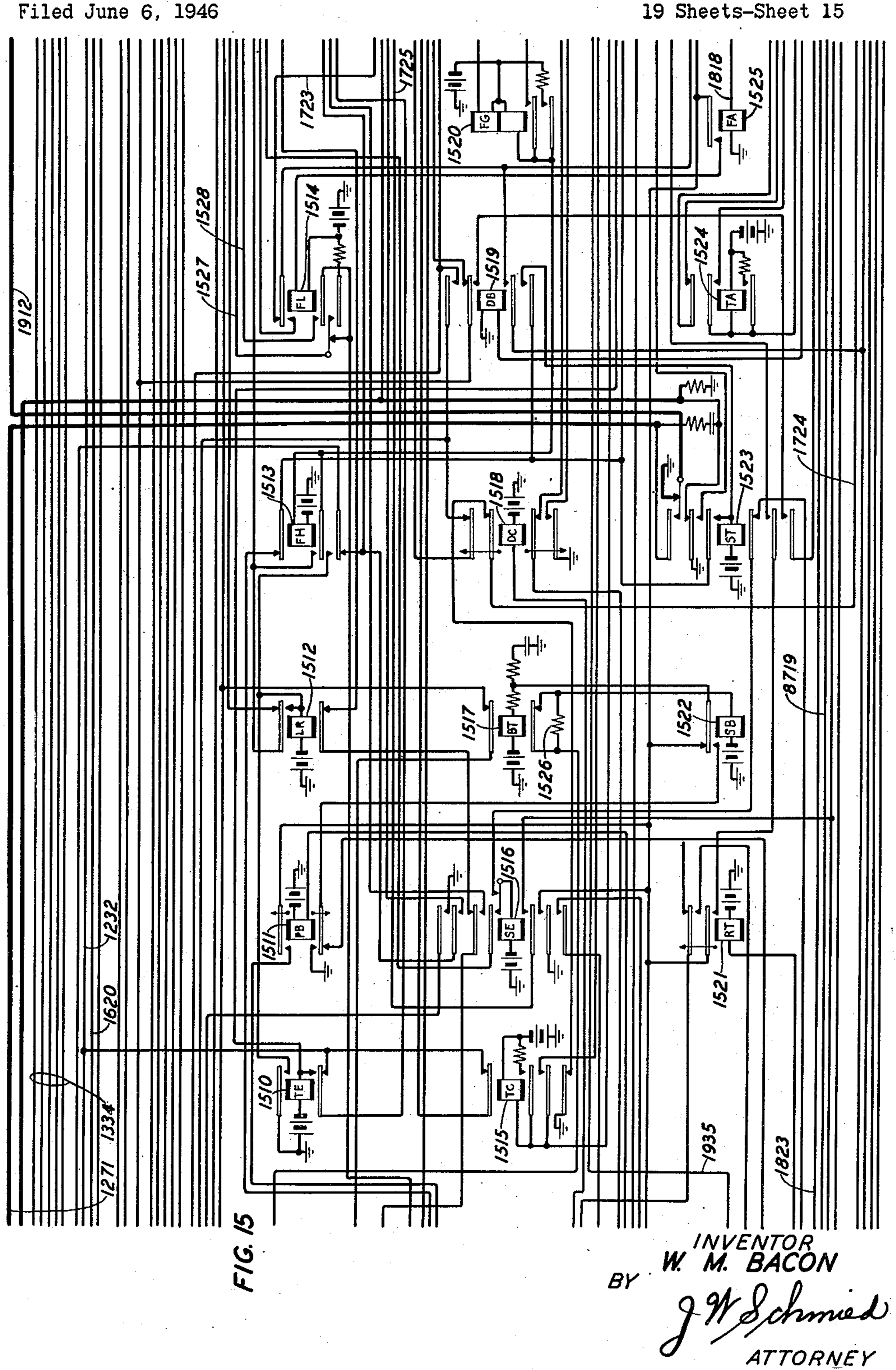
Figure 16:
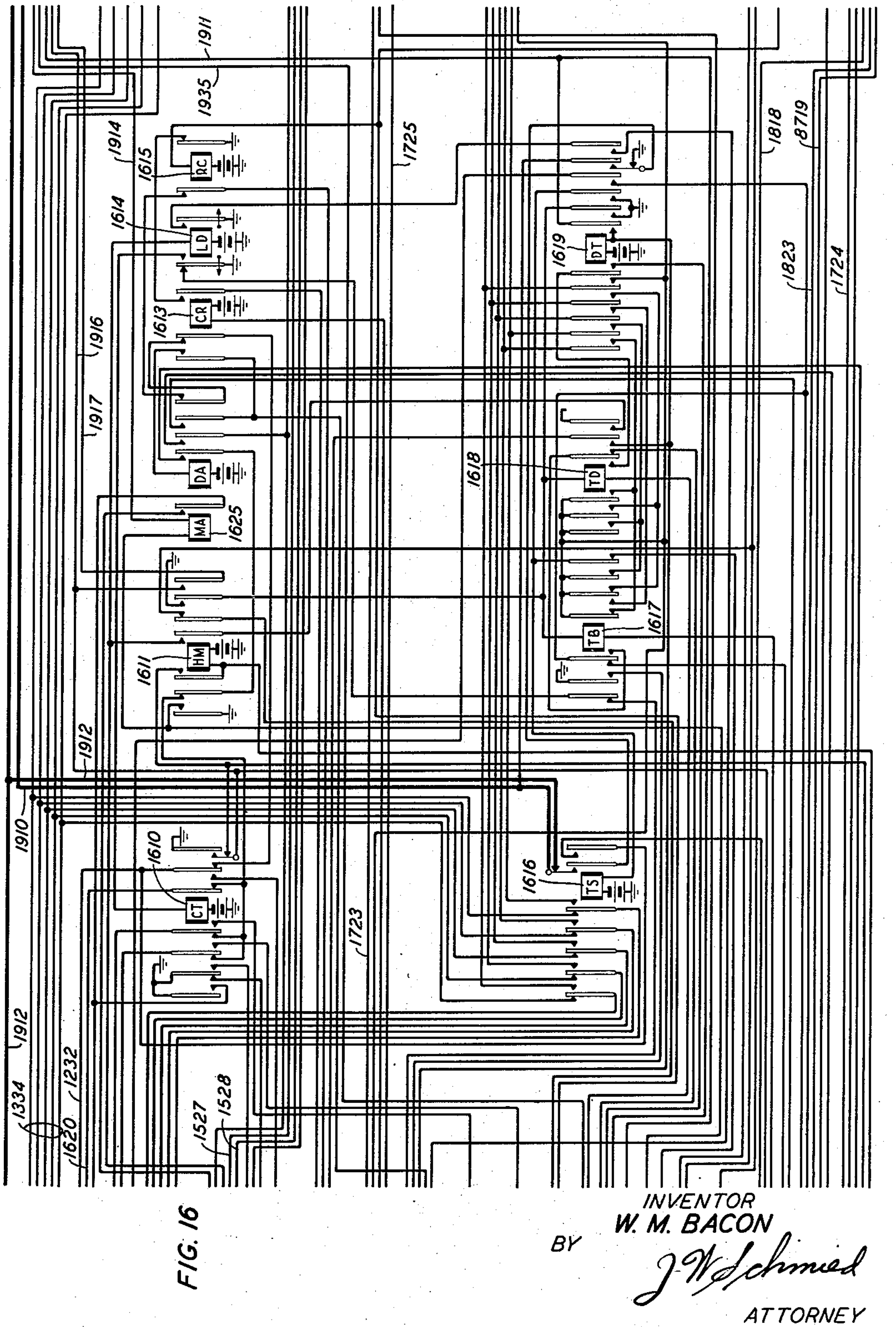
Figure 17:
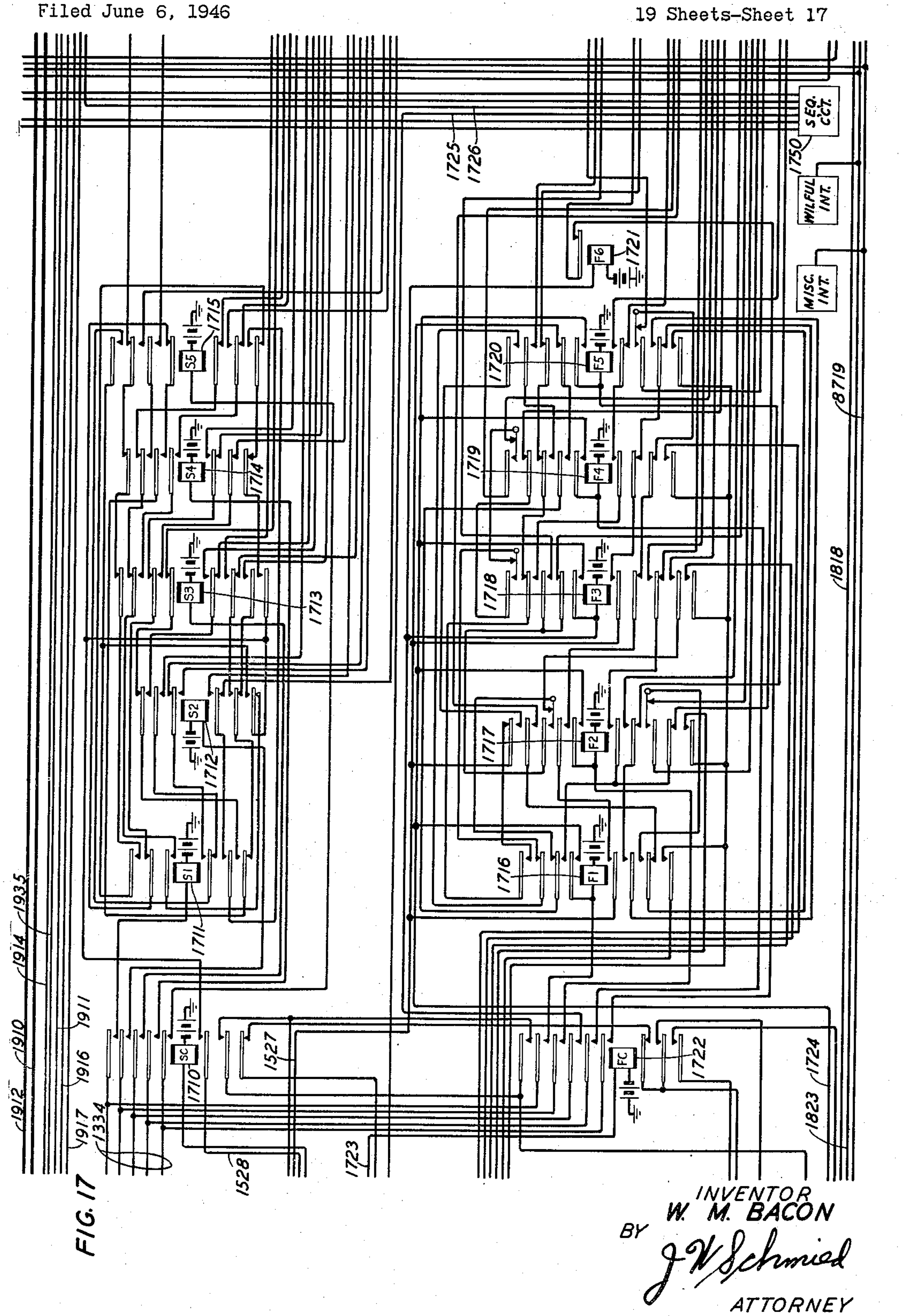
Figure 18:
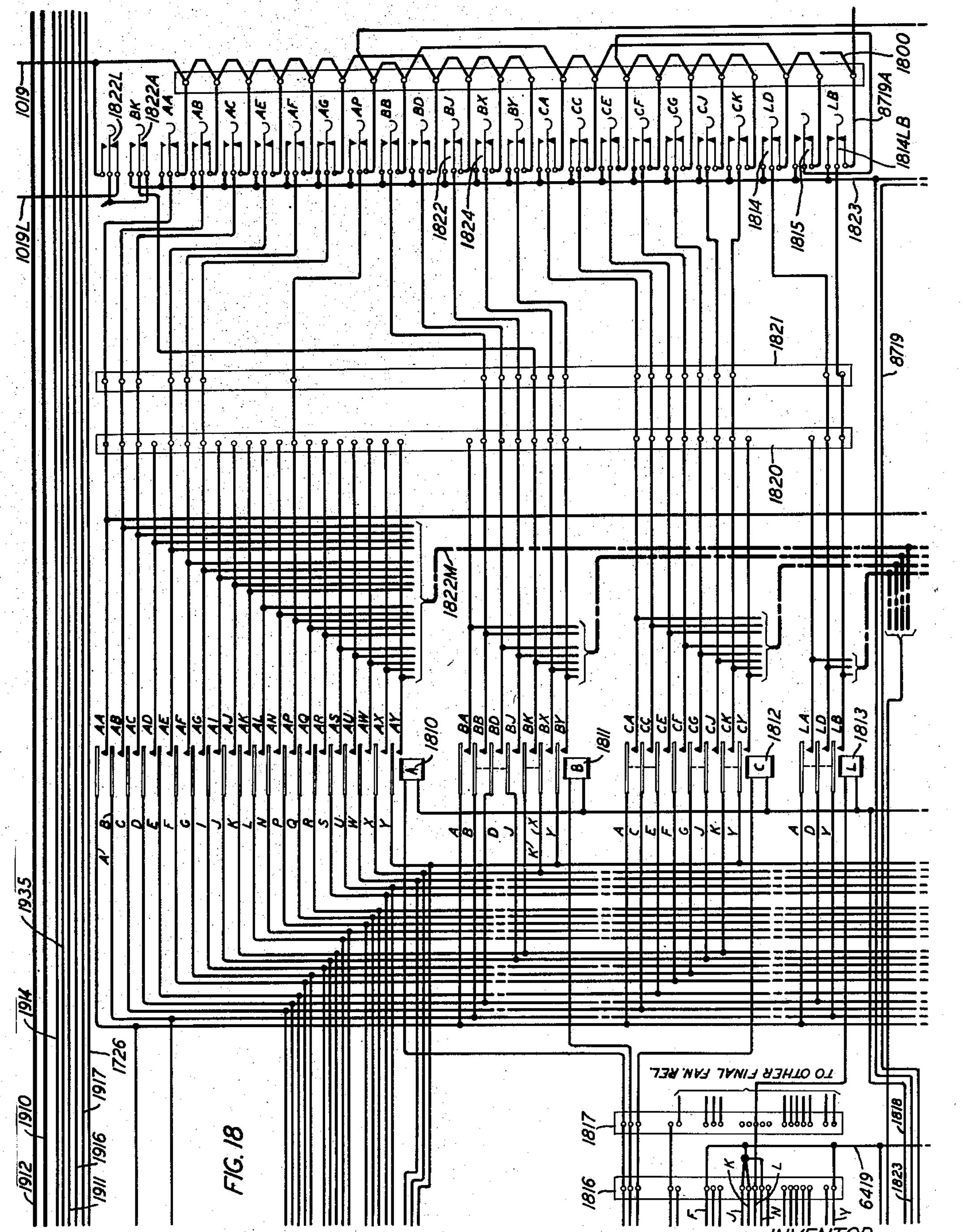
Figure 19:
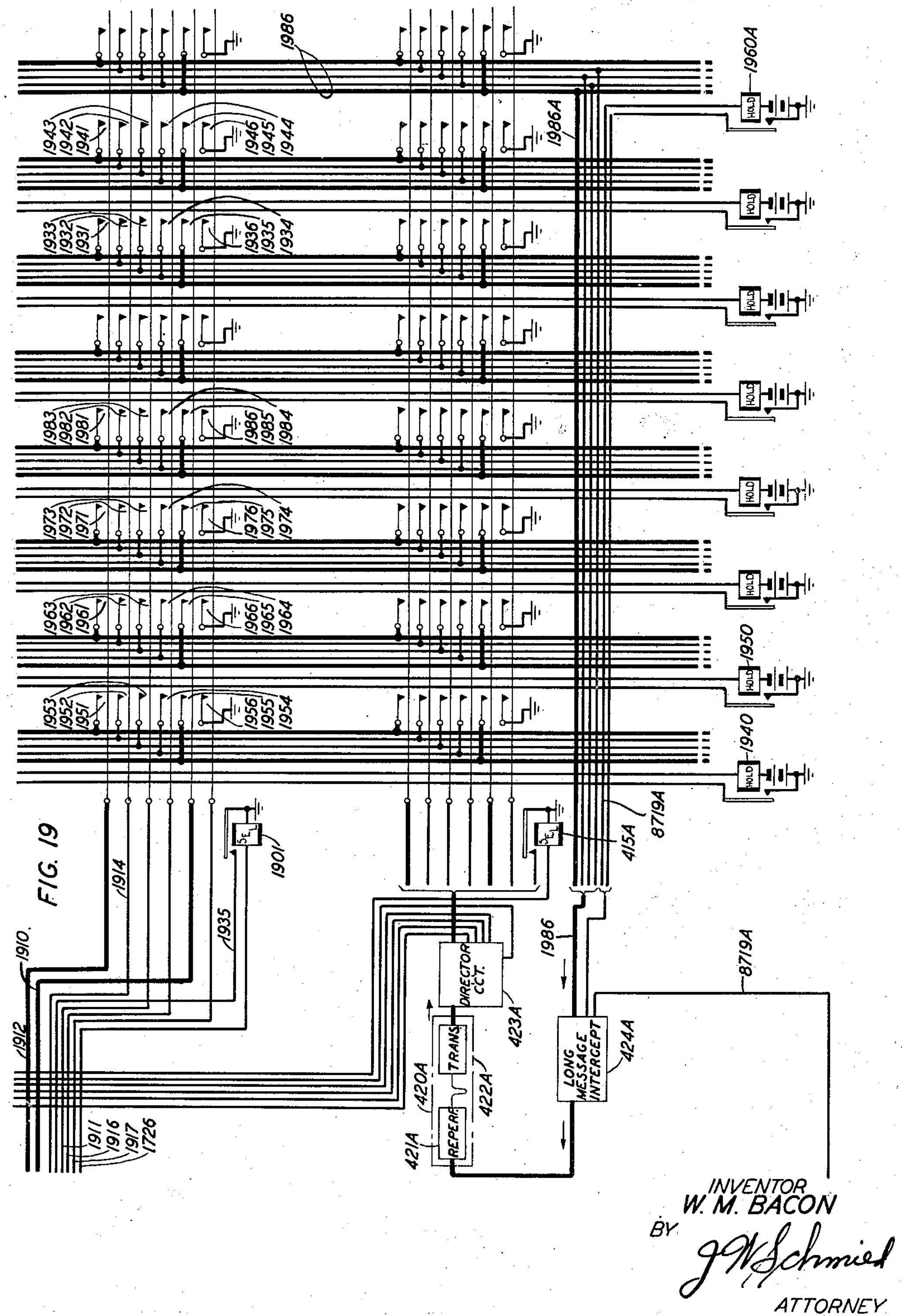

| Figure of Present Disclosure | Figure of Branson et al Disclosure |
|---|---|
| Fig. 2 | Fig. 2. |
| Fig. 3 | Fig. 3 modified to include cross-bar vertical and selecting leads of long message intercept circuit and appurtenant apparatus. |
| Fig. 4 | Fig. 4 modified to include long message intercept circuit together with selecting and transmission leads appurtenant thereto. |
| Fig. 5 | Stations of and line 210 of Fig. 2 with an appropriate portion of Fig. 3. |
| Fig. 6 | Fig. 17 as modified. |
| Fig. 7 | Fig. 18 as modified. |
| Fig. 7A | Do. |
| Fig. 8 | Fig. 19. |
| Fig. 9 | Fig. 20. |
| Fig. 10 | Fig. 21 as modified. |
| Fig. 11 | Fig. 22 modified to include contacts of an additional line circuit. |
| Fig. 12 | Fig. 74. |
| Fig. 13 | Fig. 75. |
| Fig. 14 | Fig. 76. |
| Fig. 15 | Fig. 77. |
| Fig. 16 | Fig. 78 as modified. |
| Fig. 17 | Fig. 79 as modified. |
| Fig. 18 | Fig. 33 or Fig. 80 as modified. |
| Fig. 19 | Fig. 34 or Fig. 81 with addition. |

Reference numerals not specifically mentioned herein identify corresponding parts of the Branson et al. disclosure when account is taken of the fact that the last two digits identify specific elements and the first one of 3-digit numbers and the first two of 4-digit numbers identify the figure of location of such elements.

Let it be supposed that the outlying subscriber upon any outlying station of the system, for example, the subscriber at station 216 who uses the transmitter-distributor 235, wishes to send a long message to a station such as the station 219 which, it will be noted, has two receivers, one designated by the address BK. The receiver BK may or may not especially be assigned for the receiving of long messages. In the case where it is so assigned it may include a page printer adapted to print messages on multicopy forms. The operations and principles would be similar in case any other outlying station wished to send a long message to any other outlying station. The operator at the station 216 perforates tape comprising a long message and its address beginning with the address LBK. The manner in which the central office equipment controls the initiation of the transmission of this message from transmitter-distributor 235 and its delivery to a reperforator 326 in the central office is completely elucidated in the basic Branson et al. disclosure. Upon arriving in the reperforator 326 the immediately effective part of the address, namely, LB, functions to deliver this message to the reperforator of a long message intercept circuit consisting of reperforator 421A, transmitter 422A, a long message director 423A, and control relays 424A. The lead extending from the control relays 312 through the normally positioned intercept keys 391 to the long message intercept circuit through the control relays 424A controls the delivery of this message to the long message intercept circuit in the same manner as that in which a message is described as delivered through an operated intercept key to the wilful intercept circuit in the basic Branson et al. application except that the transmission path is such that the character L is dropped from the address in the same manner as that in which the initial character of the two-character address is dropped from a message in delivering it cross office to an outgoing party line reperforator. In the Branson et al. disclosure each outgoing line reperforator, each outgoing trunk reperforator and each intercept reperforator is provided with one vertical on a cross bar switch. Over this vertical there are two transmission paths. For transmission to reperforators associated with trunks or to intercept reperforators the transmitters transmit over the right-hand transmission lead of the vertical on the cross bar switch and the left-hand transmission lead remains idle although it is connected from the cross office transmitter through the director. In transmission over this right-hand transmission lead no address character is dropped and the full address is transmitted to the particular reperforator in question to which a connection is made. On the other hand, in the case of transmission to an outgoing line reperforator associated with a party line the transmission is over the left-hand transmission lead of the cross bar vertical and the right-hand one remains idle; in this case the cross office transmitter and each associated director is so arranged that this left-hand transmission lead is grounded during transmission of the first character of the address for which reason said first character does not arrive at the connected reperforator and is not recorded thereby.

In accordance with the present invention the exemplary and every other intercept reperforator for long messages is provided with an additional vertical on a cross bar switch with its own holding magnet, this vertical being designated 1986 in Fig. 19 and its transmission conductor being designated 1986A in Figs. 3, 4, and 19; its holding magnet being designated 1960A in Figs. 4 and 19; the lead to this holding magnet being designated 8719A in Figs. 4, 18, and 19. It will be seen that on the vertical conductors 1986 the long message intercept reperforator is connected to the left-hand transmission lead of the cross bar vertical in the same manner as the outgoing line reperforators are connected in Fig. 11. Consequently, when the long message having the code address "LBK" is delivered to the long message intercept reperforator the "L" has been dropped and the address which remains is "BK." Other code addresses beginning with "L" and having any other subsequent characters such as LCA or "LCL" may have their selecting leads multipled at terminal 1800 to direct messages to the long message intercept circuits. In fact any pair of characters may be assigned to thereby direct messages. Moreover, more than one long message intercept circuit may be provided and these may be so arranged as to have long messages directed to them selectively or directed to a pair of them alternately or to only one of the pair if one is idle, in the same manner in which messages are directed to an outgoing line or directed to reperforators 1909 or to 2009 in Figs. 8 and 9 of the present disclosure, Figs. 19 and 20 of the Branson et al. disclosure.

It has now been explained how certain messages preceded by three character addresses beginning with the character "L" or other suitable character assigned for the purpose, become delivered to the one or other long message intercept reperforators with incident dropping of the "L" or other character which causes them to be so directed. Transmission out of the tape produced by such a long message reperforator is then entirely similar to transmission from a message originating transmitter in the central office, an example of which is shown in Fig. 12 of the present application together with its associated control and director circuits shown in Figs. 13, 14, 15, 16, 17, 18, and 19.

The arrangements by which delivery of such long messages either from a long message intercept transmitter or a local long message originating station to outgoing line reperforators are conditioned in accordance with the first exemplary embodiment of the invention will now be described. As previously stated, such a long message can be delivered to only one of the two outgoing line reperforators and then only when both line reperforators are devoid of message material. It will be assumed that such a message has the address BK and consequently, is directed to a receiving recorder 229 at station 219. By reference to Fig. 18 the selecting lead BK beginning on a contact of relay 1811 proceeds over an intercept key 1822A designated BK. If the intercept key 1822A is not normal, that is, operated, as could be the case if station 219 is idle for the day or out of order, this long message would be directed to a wilful intercept circuit over lead 1823 and thereafter proceed in the regular manner as described in the Branson et al. disclosure. This, however, would be an unusual condition and ordinarily the intercept key 1822A would be normal as indicated and the lead would proceed to a special key 1822L. If the key 1822L were operated the message would be directed to one or the other of the outgoing line reperforators of Figs. 8 and 9 in the regular manner. This, however, would only be the condition when long messages were to proceed as regular messages. Ordinarily the long message key 1822L would be normal as positioned in Fig. 18 and the selecting lead 1019L would proceed through Figs. 10, 9 and 7 to the armature of relay 710. If the relay 710 were operated the lead would be grounded at a front contact which would give a busy indication to the busy test relay 1517 and no selection would occur. The relay 710 would be operated whenever one or more untransmitted characters were stored in tape 830 of the reperforator machine of Fig. 8 which is known as the upper level or No. 1 reperforator of line 210. If no characters were stored in tape 830 relay 710 would be released and the testing lead 1019L would continue to the armature of relay 719. If the lower level machine or No. 2 reperforator machine of line 210 in Fig. 9 had in its tape 930 at this time one or more untransmitted characters the relay 719 would be operated to ground the transmission lead which would give a busy indication to relay 1517 and no selection would occur. If, however, the tape 930 of the lower level machine of Fig. 9 were devoid of stored characters, the selecting lead 1019L would be continued over a back contact of relay 719 to the middle armature of relay 1016. Relay 1016, being released, the lead would be extended to battery over the inner upper armature and back contact of relay 1017. This would cause the relay 1517 to operate. It therefore appears that in addition to the normal busy condition of reperforator 319 due to the fact that it is at the instant connected to a transmitter for the recording of a message there is a super-imposed busy condition which is a function of whether or not unsensed message material is at the time stored in tapes 830 or 930.

The result of these operations is that the holding magnet 1950 operates (horizontal magnet 1901 being already operated as described in the Branson et al. disclosure) to connect the transmitter 412 (Fig. 4) which is more fully disclosed in Fig. 12, to the receiving magnet 925 of the lower level reperforator shown in Fig. 9. The long message will then be transmitted to the lower level reperforator of Fig. 9 and stored in the tape 930 thereof. Following this other messages from other cross office transmitters may be stored in the same tape and also after the initiation of storage any number of other messages may become stored in the tape 830 of the upper level machine. Messages stored by the two reperforators will be transmitted over the outgoing line in the manner set forth in the Branson et al. disclosure it being noted that no further message from the transmitter of Fig. 12 or other long message transmitters seeking access thereto over lead 1019L may be delivered into storage in the reperforator of Fig. 9 until such time as both of relays 710 and 719 have become simultaneously released and this will not happen until such a time as both tapes 830 and 930 are void of untransmitted message characters. Assuming that storage of a long message by the reperforator of Fig. 9 in the tape 930 has commenced it may be possible that storage of several other messages in the tape 830 of the reperforator of Fig. 8, one after the other, will be initiated and will proceed. Whichever transmitter associated with these reperforators seizes the outgoing line will proceed to transmit one message. If this happens to be a message from tape 830 the transmitter associated with tape 930 will take the next turn and subsequent messages, however long or short and of whatever number, which have arrived in tape 830 will be obliged to remain stored in the tape 830 until the long message stored in the tape 930 has been completely transmitted. It will be noted that cross office transmission for the purpose of storing the long message in tape 930 of Fig. 9 will be over the left-hand transmission lead of the vertical on the cross bar switch under the control of vertical magnet 1950 with the result that the character B of the address BK will have been dropped. The manner in which a message proceeds over the outgoing channel 211 of the party line 210 and is recorded in the recorder 229 of the outlying station 219 under control of an address character such as the character K is all set forth in the Branson et al. disclosure and need not be repeated here.

As above stated Fig. 6 of the present disclosure corresponds in general to Fig. 17 and other correlative figures of the Branson et al. system but it has been modified. The purpose of these modifications is this: In systems of the present type transmission over an outgoing line is interrupted or may be interrupted by manual control or from time to time for the purpose of sending out transmitter stop and control signals including start patterns for initiating inward transmission toward the switching office from outlying transmitters. With Fig. 6 remaining according to the Branson et al. disclosure relays 710 and 719 would become released when outgoing transmission from their respective transmitters become interrupted. This would permit the initiation of storage of additional long messages by the reperforator 319 of Fig. 9. This, in some measure, would prevent the purposes of the present invention from being accomplished. Consequently, the arrangements of Branson et al.'s Fig. 6 have been modified. In general, these modifications reside in means whereby relays 710 or 719 are not released when the transmitter stop key 2039 is operated or when the relay 601 is operated incident to interruption of transmission for the purpose of sending transmitter control signals out over the line if then respective transmitters leave one or more unsensed characters in their tape. Taking relay 719 for an example and assuming that relay 601 operates while tape 930 is provided with one or more untransmitted code combinations, it will be seen that relay 719 has an operating path maintained from battery, through its winding, over a back contact of relay 611, conductor 614, to ground on the tape contact 921 which is closed when untransmitted characters are present in the tape 930.

In accordance with a second exemplary embodiment of the invention as previously described, the selecting lead 1019L proceeds to a modified form of Fig. 7 which is Fig. 7A. Up to the point where lead 1019L passes through key 1822L it is no different than the arrangement just described. However, the lead 1019L in the modified arrangement proceeds to the armature of relay 719. If relay 719 is operated the lead is grounded and a busy indication is given to the relay 1517. If relay 719 is released the lead 1019L proceeds over a back contact thereof to the armature of relay 719A. If the relay 719A is operated lead 1019L is continued to the middle armature of relay 1016 over which it meets battery to make a selection which connects the transmitter of Fig. 12 or any other similar transmitter, such as a long message intercept transmitter, to the reperforator 319 to initiate storage of the message in tape 930. If, however, relay 719A happens to be released ground will be applied to lead 1019L which will give a busy indication to the busy test relay 1517. It therefore becomes pertinent to inquire when and under what circumstances relay 719A will be operated. In the first place, when relay 719 is released the relay 719B will always be operated. If relay 710 is released relay 719A will be operated and will lock up over its own armature. After being locked up relay 719A will remain operated until such time as relay 719B is operated and relay 719 is released whereupon the winding of relay 719A will be short-circuited and it will be released. For the purpose of outlining the operation the transmitter of Fig. 8 will be designated transmitter No. 1 and the transmitter of Fig. 9 will be designated transmitter No. 2. Their respective reperforators will be similarly designated No. 1 and No. 2. When transmitter No. 1 has no unsensed characters stored in its tape, it will be described as idle, but when it has one or more unsensed characters it will be described as busy. Likewise, transmitter No. 2 will be described as idle when it has no unsensed characters in its tape and busy when it has one or more unsensed characters. When transmitter No. 1 is idle relay 710 is released, when it is busy relay 710 is operated; likewise, when transmitter No. 2 is idle relay 719 is released, when it is busy relay 719 is operated. It will be remembered that messages from ordinary cross office transmitters select one or another of the reperforators associated with transmitters No. 1 and No. 2 alternately or whichever is idle regardless of the presence or absence of unsensed tape whereas long message transmitters such as the transmitter of Fig. 12 or similarly arranged long message intercept transmitters make their selections over lead 1019L and, consequently, their messages can be stored in reperforator 926 associated with transmitter No. 2 only, that is, on the assumption that key 1822L is normal. Consequently, the path of selecting lead 1019L to the middle armature of relay 1016 can be established only when the lead is closed at a back contact of relay 719 and a front contact of relay 719A. Therefore, the selecting lead 1019L can be established under the following conditions, always with reference to Fig. 7A:

*Condition No. 1*

Transmitter No. 1 is idle and transmitter No. 2 is idle. Relay 719 is operated, 719B is operated and locked, and relay 719A is operated and locked and the selecting path 1019L is established so that the reperforator No. 2 is available to accept a long message.

*Condition No. 2*

Transmitter No. 1 remains idle and transmitter No. 2 becomes busy, i. e. supplied with tape. The selecting path 1019L is grounded at relay 719; consequently, reperforator No. 2 cannot accept a long message under this condition but both reperforators may accept other messages; also relay 719A is released over a lower front contact of relay 719B and a lower front contact of relay 719, relay 719B is also released.

*Condition No. 3*

Transmitter No. 1 remains idle and transmitter No. 2 becomes idle. Relay 719B reoperates and relay 719A reoperates. The selecting lead 1019L is closed and the selection of reperforator No. 2 for transmitting a long message thereto may be made.

*Condition No. 4*

With both transmitters idle transmitter No. 1 becomes busy while transmitter No. 2 remains idle. Relay 619A remains locked over contacts of relays 719B and relay 719, and relay 719B remains operated. The selecting lead 1019L is closed because transmitter No. 1 had been idle at a time before transmitter No. 2 became busy, a selection of reperforator No. 2 by a long message transmitter may be made. This selection is independent of the condition of outgoing path 211 of line 210.

*Condition No. 5*

During Condition 4 transmitter No. 2 becomes busy while transmitter No. 1 remains busy. Ground over the front contact of the lower armature of relay 719B and upper armature of relay 719 releases relay 719A. Relay 719B releases because both its operating and locking paths are open. The selecting path 1019L is grounded at a front contact of relay 719 and no selection by a long message transmitter may be made.

*Condition No. 6*

With both transmitters busy as per Condition No. 5 transmitter No. 1 becomes idle either once or any number of times while transmitter No. 2 remains busy. When transmitter No. 1 first becomes idle relay 719A operates and locks because relay 719 is operated but selecting path 1019L is grounded at relay 719. During this time reperforator No. 1 may accept and store one or several messages while reperforator No. 2 is storing one long message. Transmitter No. 2 remains busy. No selection of reperforator No. 2 may be made by a long message transmitter but, of course, reperforator No. 1 may accept any number of other messages.

*Condition No. 7*

Transmitter No. 2 then becomes idle. Relay 719A remains operated and relay 719B operates but since there is no ground furnished over its upper front contact from relay 719 it does not release relay 719A. When this happens the transmission lead 1019L is established and transmitter No. 2 may accept one long message even though several other messages may at the moment be stored between reperforator No. 1 and transmitter No. 1 awaiting transmission. One long message accepted by transmitter No. 2 may be transmitted before one or several messages stored between reperforator No. 1 and transmitter No. 1 but no further long message may be accepted by reperforator No. 2 whether or not it becomes void of untransmitted stored material until transmitter No. 1 at some time becomes void of untransmitted stored material.

It therefore appears that messages other than long messages will never become stored behind more than one long message and that messages other than long messages will never be delayed in transmission because of a long message by more than the transmission time of one long message; however, several other messages may at times be so delayed by one long message. It also appears that a pair of outgoing line transmitters will never be devoid of message material awaiting transmission at any time while any message including the class of messages designated long messages are awaiting transmission in the tape of an incoming line reperforator or the tape of a switching office message originating station except fortuitously and at rare intervals such a message may have to await the use of the cross bar switch. However, since the cross bar switch is used for a time of the order of a fraction of a second for routing each message, delays due to this cause will be exceedingly short. As previously stated, the object of the invention is to prevent the clogging of the outgoing line transmitters at the switching office by the class of messages designated long messages but the same principles may be applied to any particular class of messages whether long or short.

Furthermore, messages of the class of long messages as we have previously pointed out may normally be directed by means of a selecting lead 8719A to one or another of one of the long message intercept circuit reperforators. If it should happen that the tape of the long message intercept reperforators becomes clogged with too great an accumulation of such messages during a time when the system is working at full capacity, such messages may be intercepted by operating key 1814LB which causes them to be directed to one or one of more than one wilful intercept reperforators 421 which is or may be provided in a system of this type. Key 1814LB, when operated connects code point LB to lead 1823 for this purpose. In being transmitted to this wilful intercept reperforator these messages will not drop the character "L" from their address designation and such character will remain stored as the first code of the address "LBK" so that later they may be transmitted automatically from the wilful intercept transmitter and delivered to a long message intercept reperforator from which they will take their course in the manner previously described. Also it is obvious that certain long messages stored in long message intercept circuits may be intercepted in part in wilful intercept circuits by operating intercept keys corresponding to their individual addresses to the exclusion of others which are automatically routed to their proper outgoing lines. It is therefore seen that the system is extremely flexible; by operating appropriate keys at appropriate times a sorting operation of various messages may be carried on whereby certain messages may be sorted out from others and arranged in consecutive order in a storage tape; and whereby the others may be arranged in consecutive order in another storage tape or forwarded over outgoing channels; all this being done automatically with no more difficulty than the timely operation or release of appropriate keys. Once having been sorted one group of messages may be transmitted ahead of another or not at will by the operation of certain other keys.

In accordance with the second exemplary modification of the invention described, namely, that involving the use of relays 619A and 619B, outgoing line reperforator No. 1 accepts certain messages in accordance with certain conditions outlined. However, other relay arrangements can and have been devised for performing the same function; such other arrangements are species of the generic invention herein claimed. Furthermore, it is apparent that the selecting lead 1019L need not necessarily be limited to selection of reperforator No. 2 but after passing through contacts of relays 619 and 619A it may be extended to connect back to selecting lead 1019 whereby either reperforator No. 1 or reperforator No. 2 or both may be enabled to receive a long message under the same conditions as previously outlined whereunder reperforator No. 2 may receive a long message. This further illustrates the flexibility of a system of this type as it will enable only some given maximum number of one class of message to proceed over a cross office path while others of another class concurrently await transmission over a path to outgoing line perforators associated with the particular outgoing line.

The Branson et al. system discloses an arrangement in which at a first switching office which we may call "Office A" code addresses beginning with certain characters direct their messages over a trunk to another switching office which we may call "Office B." In the disclosure the initial code character "L" is a character so chosen. Care must be taken to avoid confusion of characters so in the present system it is assumed and indicated that character "L" is not so used in the office illustrated in the drawings. This leads to a discussion of a system of this type in which a message of a class designated "long message" may be directed to a special long message intercept reperforator at "Office A" and again at "Office B." This can be done by proper assignment of addresses. Let all addresses of long messages originating at the "Office A" end of the system directed through the "Office B" end of the system begin with "L" which, in combination with a second character identifies a selection path which leads to the long message intercept circuit and let all addresses beginning with a chosen character such as "F" direct such messages over a trunk. Thus, a message having the address "LFYX" at "Office A" could be sent to long message intercept by "LF," "L" being discarded; to an outgoing trunk by "FY"; to a long message intercept at "Office B" by "FY," "F" being discarded; to a proper outgoing line by "YX,"

"Y" being discarded; and to a proper receiving station by "X."

At "Office B" a message having the address "FLBK" would be sent to a long message intercept together with all other messages having "F" as a first directing character, "F" being discarded; to a trunk extending to "Office A" by the characters "LB," along with other pairs of characters beginning with "L"; to a long message intercept at "Office A" by "LB," "L" being discarded; to the proper outgoing line 210 by "BK," "B" being discarded, and to the proper receiving station and recorded 229 by character "K."

Thus, "L" followed by any character could direct messages to the long message intercept at "Office A"; and "F" followed by any character could direct messages to the trunk toward "Office B"; at "Office B," "F" followed by any character could direct messages to the long message intercept and "L" followed by any character could direct messages to the trunk toward "Office A." Suitable selection of address codes and cross connections and multiple connections to code points could be made accordingly. The flexibility and utility of systems involving apparatus and methods according to the invention is thus further exemplified.

What is claimed is:

1. In a telegraph switching system, an outgoing line provided with a plurality of transmitters operable one at a time to transmit messages thereover, a respective plurality of storage devices for storing messages to be transmitted by said transmitters, and transmitting means for delivering messages to said storage devices, in combination with means whereby said transmitting means when conditioned by addresses of certain messages may deliver said messages to some only of said storage devices, and other means whereby when conditioned by addresses of other messages may deliver said other messages to any one of all of said storage devices.

2. In combination, a plurality of tape reperforators and message transmitters for directing messages selectively to said tape reperforators, two of said tape reperforators comprising a pair, means whereby tape already perforated by some one of said reperforators controls the selection of one or more thereof, and means whereby said transmitters may select and deliver certain messages to one of said pair only when all reperforated message material reperforated by both thereof has been transmitted.

3. A telegraph switching system comprising a switching office having incoming channels of transmission and outgoing channels of transmission, storage devices associated with said incoming channels for storing received message material, paths of transmission from said storage devices whereby said message material is selectively delivered to outgoing channels of transmission according to addresses of the various messages constituting the same, said means comprising more than one path of transmission for any given message, certain codes accompanying said messages constituting addresses, means whereby messages having certain addresses are limited to transmission over less than of the whole of said paths, and means whereby other messages are not so limited.

4. In an automatic message relaying and directing system, a switching office, main paths of transmission of messages through said office, means for receiving and storing in record medium incoming messages preceded by code representing addresses, means operated automatically under control of auxiliary codes accompanying said addresses of certain messages to withdraw said messages accompanied by said auxiliary codes from said main paths of transmission through said office, means to automatically restore said withdrawn messages to said main paths of transmission, and further means limiting said restoring operation to special times in accordance with the message load condition of particular channels of transmission leading away from said office.

5. A telegraph transmission system comprising certain means for receiving and storing messages incoming to a switching office, means for initiating and storing messages originated at said switching office, means capable of operation for transmitting all of the messages from said office indiscriminately in accordance with stored addresses preceding them and stored as a part thereof, supplemental means capable of being conditioned for operation for automatically restricting the transmission of certain messages originated at said office in accordance with the load condition of transmission paths across said office extending from said certain means toward channels of transmission extending from said office, and means for so conditioning said supplemental means.

6. A message storing and retransmitting system comprising a set of devices each of which has (1) a storage medium, (2) storing means for storing message material therein, and (3) means for retransmitting said material operative under control of said medium; means including a plurality of transmitters with associated seizing means capable of seizing said storing means and transmitting certain message material thereto for storage, make-busy means conditioned by seizure of said storing means by one transmitter for preventing two of said plurality of transmitters from simultaneously seizing said storing means, other make-busy means operative to prevent seizure of said storage means by transmitters for storing certain other message material upon the condition that its medium contains untransmitted stored message material, and means to so operate said last named make-busy means.

7. In a telegraph switching system, means including intercepting and storage means for intercepting all messages having code addresses of a particular class whereby certain of said intercepted messages for which outgoing paths are presently available become stored behind one or more others of which no outgoing path is presently available, in combination with means including transmitting and selective means operative under control of the addresses accompanying said messages whereby all stored intercepted messages are withdrawn from storage, means whereby those for which outgoing paths presently exist being selectively transmitted toward their destinations of address and means whereby those for which no outgoing paths presently exist being reintercepted and restored.

8. A reperforator for storing messages having two classes of addresses transmitted thereto by means including a transmitter of said messages which selectively seizes said reperforator, busy means for making said reperforator appear busy to messages with one class of addresses when it does not appear busy to messages with another class of addresses, and other busy means effective for messages having said other class of addresses after said perforator has been seized.

9. In a system of selective telegraphic transmission, means for providing messages with a group of address codes, means selectively operable to direct each message so provided selectively over one path out of a plurality in accordance with a plurality but less than all of said address codes of said group, and means operable thereafter to direct each such message selectively over one path out of a second plurality in accordance with a plurality which includes some but less than all of the first plurality of codes and one or more codes not included in the first plurality.

10. In a telegraph system, an outgoing line, a plurality of transmitters each having a storage medium, each storage medium being provided with storing means for storing message material therein, seizing devices for seizing said storage devices, means for establishing a condition dependent upon relative previous idle or busy times of said transmitters, means whereby some one or more of said seizing devices may seize said storage devices regardless of said condition, and means whereby another one or more of said seizing devices may seize said storage devices only in the absence of said condition.

11. In a system of communication in which messages are accompanied by codes of address according to which they are successively sent over paths appropriate to cause them to reach their intended destination, selective means at one point in said system controlling the further transmission of a message according to a plurality of its said codes of address, means for preventing further use of some of said plurality for message direction, and other selective means operable at another point in said system to direct said message in accordance with a plurality of codes including a part only of said first named plurality taken together with others not comprised in said first named plurality.

12. A pair of reperforator-transmitter sets, each reperforator being connected to its associated transmitter by a loop of tape, a source of messages supplied to said reperforator for perforation by it in said tape, other message recording devices, selective means for selectively directing certain of said messages to said reperforators and certain other messages over paths to said other devices, means whereby one of said reperforators registers busy and unselectable except on the condition that it has no untransmitted reperforated material in its tape loop and the further condition that the other reperforator has at some time been devoid of untransmitted reperforated material after the first one was devoid, and means for establishing said conditions.

13. A message storing and retransmitting system comprising sets of devices each of which has (1) a storage medium, (2) storing means for storing message material therein, and (3) means for retransmitting said material operative under control of said medium; means including a plurality of transmitters with associated seizing means capable of seizing said storing means and transmitting message material thereto for storage, a make-busy potential establisher conditioned to establish a make-busy potential by seizure of said storing means by one transmitter for temporarily preventing another of said plurality of transmitters from seizing said storing means, and another make-busy potential establisher conditioned to establish a make-busy potential to render said storage means busy to certain transmitters under control of the condition of the storage medium of another of said sets of devices.

14. In combination, electromechanical means controlled by electric impulses for storing coded telegraph pulses in mechanical form, seizing means for seizing the same for storing messages therein regardless of its existing quantity of stored unused coded pulses, means for establishing a seizure permitting condition of said electromechanical means as a function of its quantity of stored unused coded pulses in its storage, and other seizing means with access to said electromechanical means for seizing the same for storing messages therein only under said seizure-permitting condition of its condition of storage.

15. The method of automatically directing messages preceded by a plural number of address codes in a telegraph system which comprises first directing a message selectively according to a portion of said plural number of codes less than the whole number thereof and acting coadjuvantly, dropping a portion of the first-mentioned portion incident to said direction, and then further directing said message according to the remaining codes including a portion of said first-mentioned portion and other codes of said plural number acting coadjuvantly.

16. In a telegraph switching system, a plurality of storage-retransmitter sets each including storage means, a medium of storage and a retransmitter controlled by said medium, a source of telegraph signals, seizure means for seizing one of said sets and connecting it to said source for transmission of signals thereto and into storage, make-busy means conditionable for allowing or preventing said seizure, busy control means controlled by a plurality of said sets and including elements actuated by predetermined amounts of untransmitted stored material, and connections whereby said busy control means conditions said make-busy means so that at any given time seizure is allowed or prevented.

WALTER M. BACON.

REFERENCES CITED

The following references are of record in the file of this patent:

UNITED STATES PATENTS

| Number | Name | Date |
|---|---|---|
| 2,179,736 | Bellamy | Nov. 14, 1939 |
| 2,304,775 | Blanton | Dec. 15, 1942 |
| 2,368,826 | Hailes et al. | Feb. 6, 1945 |
| 2,376,111 | Bacon | May 15, 1945 |
| 2,406,787 | Bacon | Sept. 3, 1946 |
| 2,430,447 | Branson et al. | Nov. 11, 1947 |